US012277920B2

(12) United States Patent
Tanida et al.

(10) Patent No.: US 12,277,920 B2
(45) Date of Patent: Apr. 15, 2025

(54) ELECTRONIC CYMBAL AND CASE ATTACHMENT METHOD

(71) Applicant: Roland Corporation, Shizuoka (JP)

(72) Inventors: Ryo Tanida, Shizuoka (JP); Syota Kobayashi, Shizuoka (JP)

(73) Assignee: Roland Corporation, Shizuoka (JP)

( * ) Notice: Subject to any disclaimer, the term of this patent is extended or adjusted under 35 U.S.C. 154(b) by 632 days.

(21) Appl. No.: 17/630,166

(22) PCT Filed: Aug. 1, 2019

(86) PCT No.: PCT/JP2019/030317

§ 371 (c)(1),
(2) Date: Jan. 26, 2022

(87) PCT Pub. No.: WO2021/019778

PCT Pub. Date: Feb. 4, 2021

(65) Prior Publication Data

US 2022/0415295 A1 Dec. 29, 2022

(51) Int. Cl.
*G10H 3/14* (2006.01)

(52) U.S. Cl.
CPC ....... *G10H 3/146* (2013.01); *G10H 2230/321* (2013.01)

(58) Field of Classification Search
CPC ......................... G10H 3/146; G10H 2230/321
USPC ............................................................ 84/600
See application file for complete search history.

(56) References Cited

U.S. PATENT DOCUMENTS

| | | | | |
|---|---|---|---|---|
| 6,632,989 | B2 | 10/2003 | Yoshino et al. | |
| 6,881,885 | B2 | 4/2005 | Yoshino et al. | |
| 2002/0059861 | A1 | 5/2002 | Yoshino et al. | |
| 2014/0260897 | A1 * | 9/2014 | Miyashita .............. | G10H 3/146 84/422.3 |

(Continued)

FOREIGN PATENT DOCUMENTS

| | | |
|---|---|---|
| JP | 2002207481 | 7/2002 |
| JP | 2009128801 | 6/2009 |
| JP | 2009128803 | 6/2009 |

(Continued)

OTHER PUBLICATIONS

"Search Report of Europe Counterpart Application", issued on Mar. 29, 2023, p. 1-p. 11.

(Continued)

*Primary Examiner* — Jianchun Qin
(74) *Attorney, Agent, or Firm* — JCIPRNET

(57) ABSTRACT

Provided are an electronic cymbal and a case attachment method with which even when a case is attached to a frame, the distribution of hit sensitivity against a hit on the frame is uniform. In this electronic cymbal (1), the case (8) is attached to the frame (4) by fitting an outer peripheral hooking section (**8*b*) of a case (8) into an outer peripheral support section (4*b*) of a frame (4), and fitting an inner peripheral enclosing section (8*d*) of the case (8) into the inner peripheral side of the frame (4). These components can be mounted without forming a screw hole in the frame (4) and screwing the case (8) and the frame (4). Thus, it is possible to suppress the stress concentration on a specific position of the frame (4) due to the screwing, and to uniformize the distribution of the hit sensitivity on the frame (4**).

20 Claims, 10 Drawing Sheets

(56) References Cited

U.S. PATENT DOCUMENTS

| | | | |
|---|---|---|---|
| 2015/0179159 | A1 | 6/2015 | Yoshino |
| 2016/0196811 | A1 | 7/2016 | Shen |

FOREIGN PATENT DOCUMENTS

| | | | | |
|---|---|---|---|---|
| JP | 2009145559 | | | 7/2009 |
| JP | 2013015852 | A | * | 1/2013 |
| JP | 2018124415 | | | 8/2018 |
| JP | 2018146820 | | | 9/2018 |

OTHER PUBLICATIONS

"International Search Report (Form PCT/ISA/210) of PCT/JP2019/030317", mailed on Sep. 24, 2019, with English translation thereof, pp. 1-2.

* cited by examiner (a)

(b)

(a)

(b)

(a)

(b)

(a) (b) (c) (d)

ELECTRONIC CYMBAL AND CASE ATTACHMENT METHOD

CROSS-REFERENCE TO RELATED APPLICATION

This application is a 371 application of the International PCT application serial no. PCT/JP2019/030317, filed on Aug. 1, 2019. The entirety of the above-mentioned patent application is hereby incorporated by reference herein and made a part of this specification.

TECHNICAL FIELD

The present invention relates to an electronic cymbal and a case attachment method.

BACKGROUND ART

Patent Literature 1 discloses an electronic cymbal in which a second frame is provided on a lower surface side of a first frame that forms a hitting surface. An output jack for transmitting an output signal related to a hit to a sound source device is stored between the first frame and the second frame. The first frame and the second frame are fixed by screws.

However, when the first frame is fixed by the screw, the stress is concentrated around screw holes of the first frame. Due to such stress, the vibration propagation in the first frame becomes non-uniform, and the distribution of the hit sensitivity against a hit on the first frame becomes biased.

CITATION LIST

Patent Literature

Patent Literature 1

Japanese Patent Laid-Open No. 2002-207481 (for example, paragraphs [0023] to [0028] and [0054], FIGS. 3 and 4, and the like)

SUMMARY OF INVENTION

Technical Problem

The present invention has been made to solve the above-described problems, and an objective thereof is to provide an electronic cymbal and a case attachment method in which the distribution of hit sensitivity against a hit on the frame is uniform even when a case is attached to the frame.

Solution to Problem

In order to achieve this object, according to the present invention, there is provided an electronic cymbal including: a frame with a disc-shape; and a case attached to a lower surface of the frame to protect electronic components, in which the frame is provided with a frame-side attaching section, the case is provided with a case-side attaching section, and the case is attached to the frame by fitting the frame-side attaching section and the case-side attaching section into each other.

According to the present invention, there is provided a case attachment method for attaching a case to a frame in an electronic cymbal that includes the frame with a disc-shape and the case for protecting electronic components, the case attachment method including: attaching the case to the frame by fitting the frame-side attaching section provided on the frame and the case-side attaching section provided on the case into each other.

Figure 3:
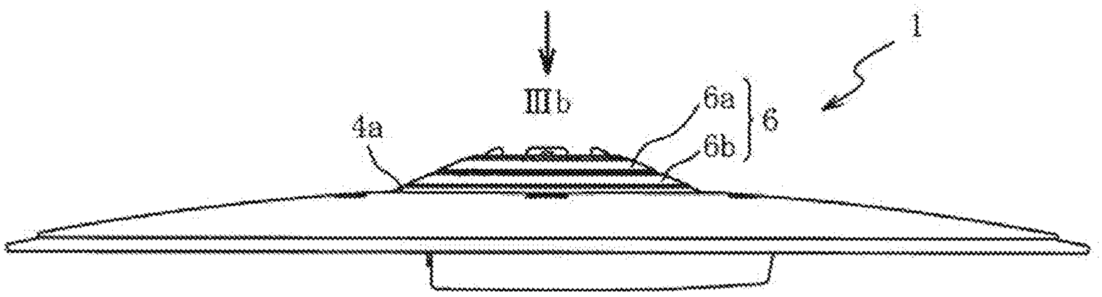
Figure 3:
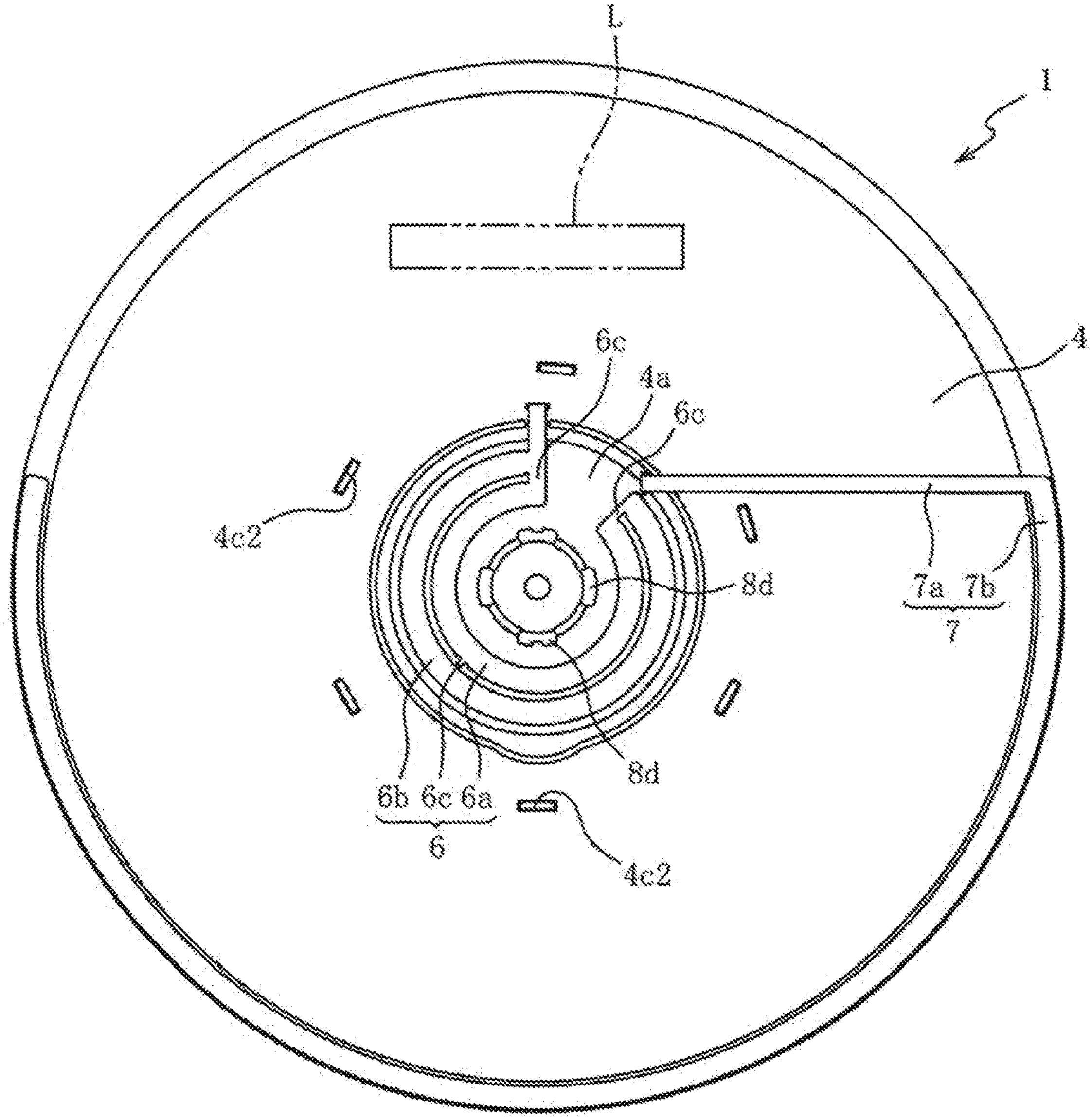

(a) of FIG. 3 is a side view of an electronic cymbal where a cover is not illustrated, and (b) of FIG. 3 is a top view of the electronic cymbal where the cover is not illustrated.

Figure 2:
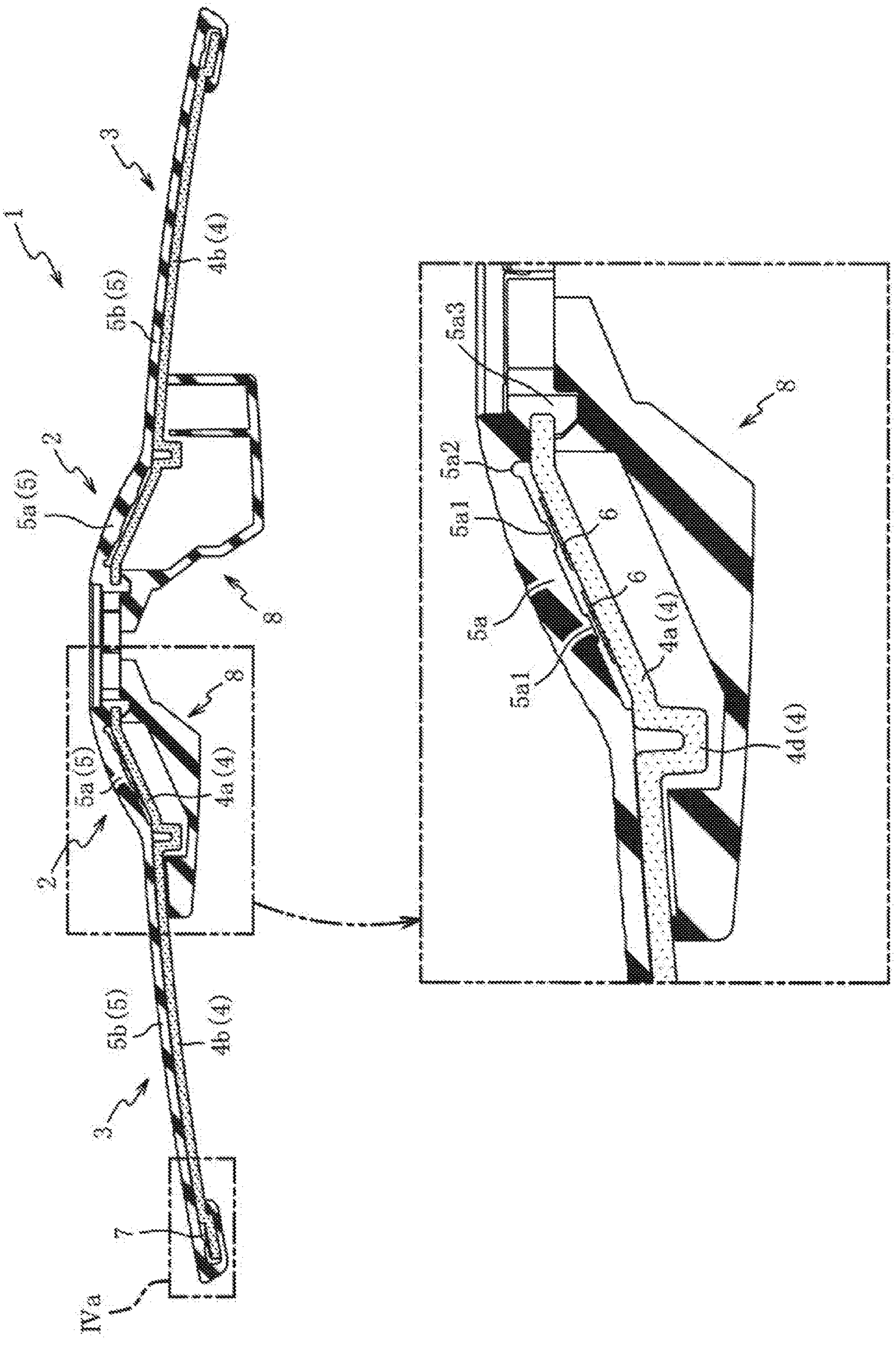
FIG. 2 is a sectional view of the electronic cymbal in a sectional line taken along II-II of FIG. 1.
Figure 4:
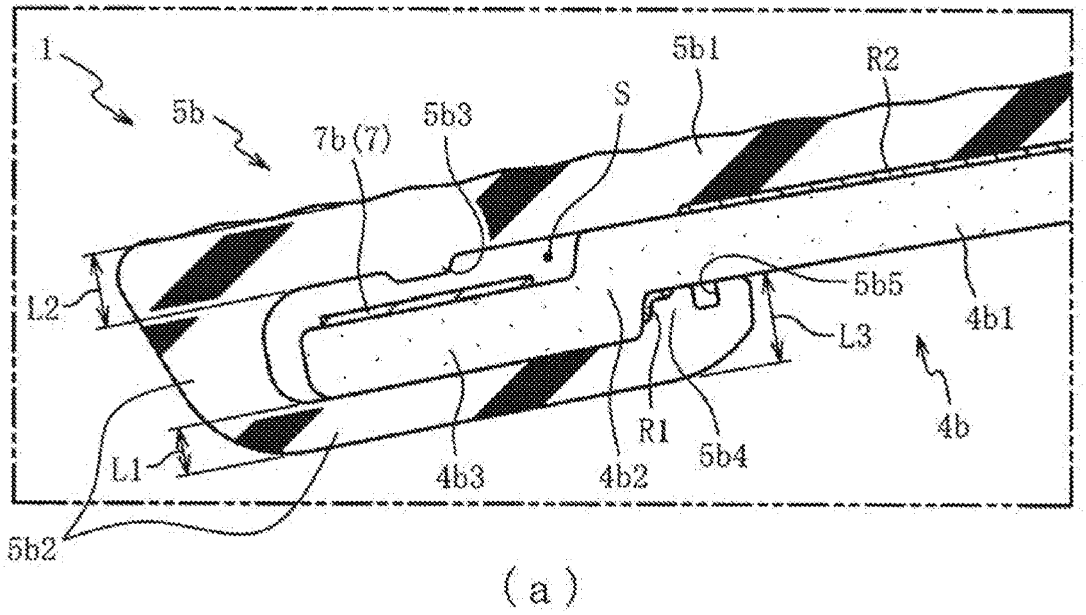
Figure 4:
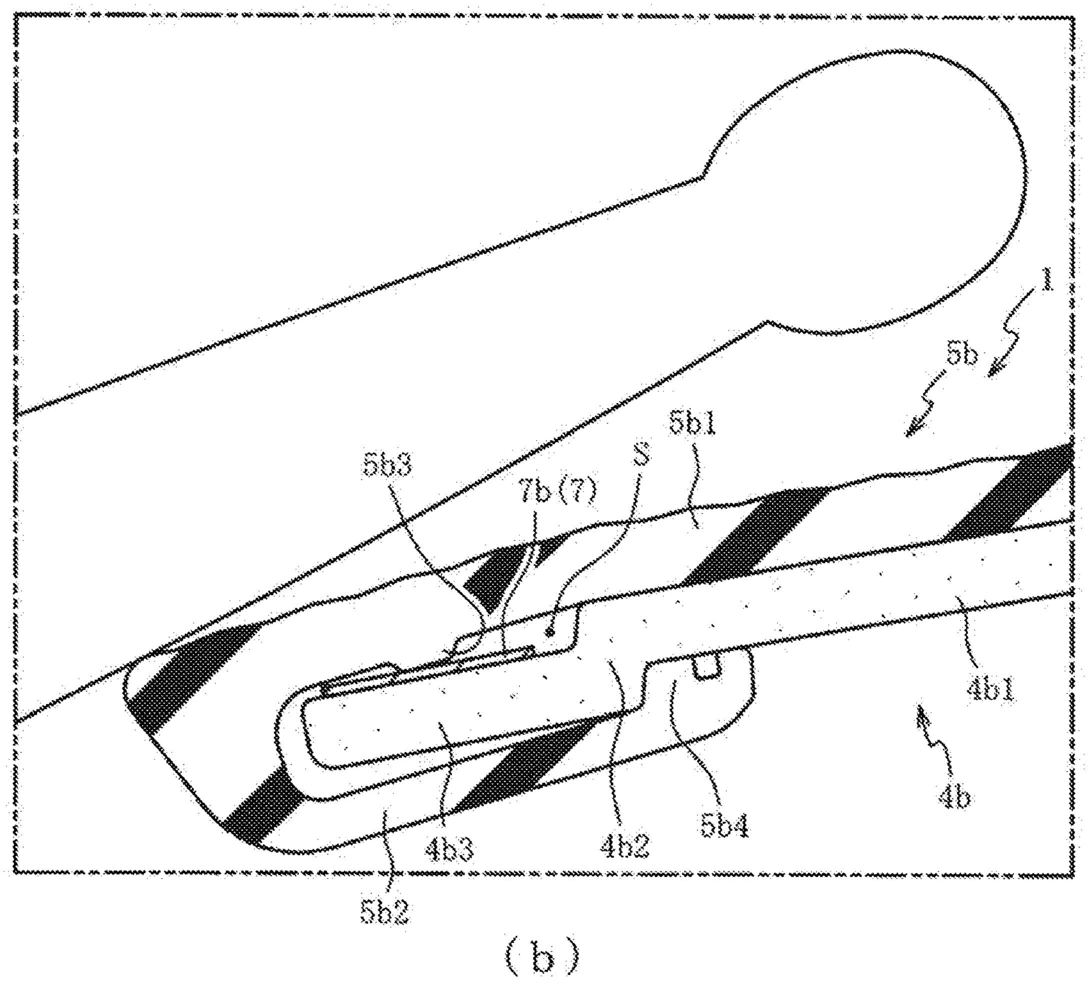

(a) of FIG. 4 is a partially enlarged sectional view of the electronic cymbal in which a IVa part of FIG. 2 is enlarged, and (b) of FIG. 4 is a partially enlarged sectional view of the electronic cymbal illustrating a state of being hit by a stick from the state of (a) of FIG. 4.

Figure 5:
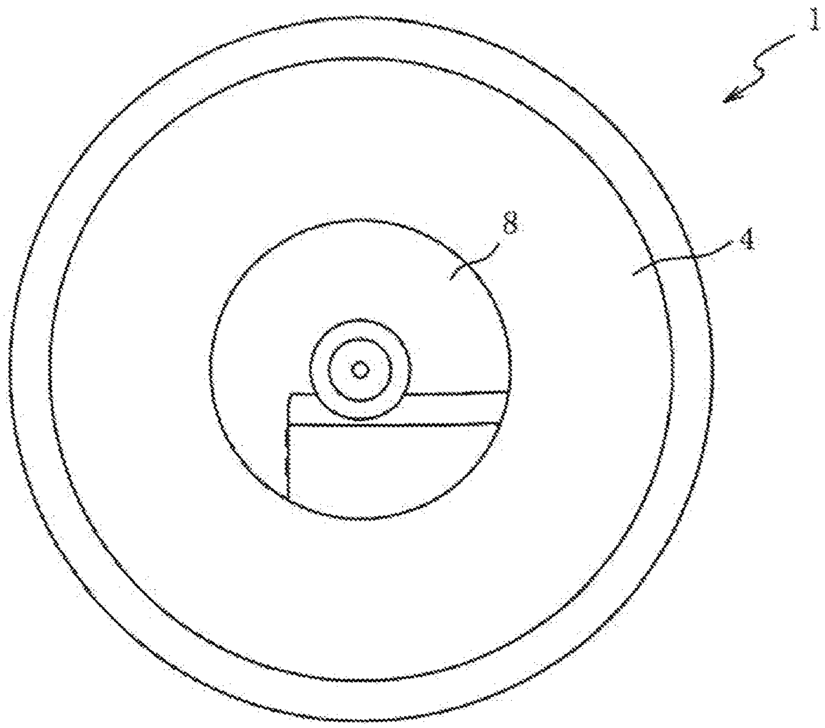
Figure 5:
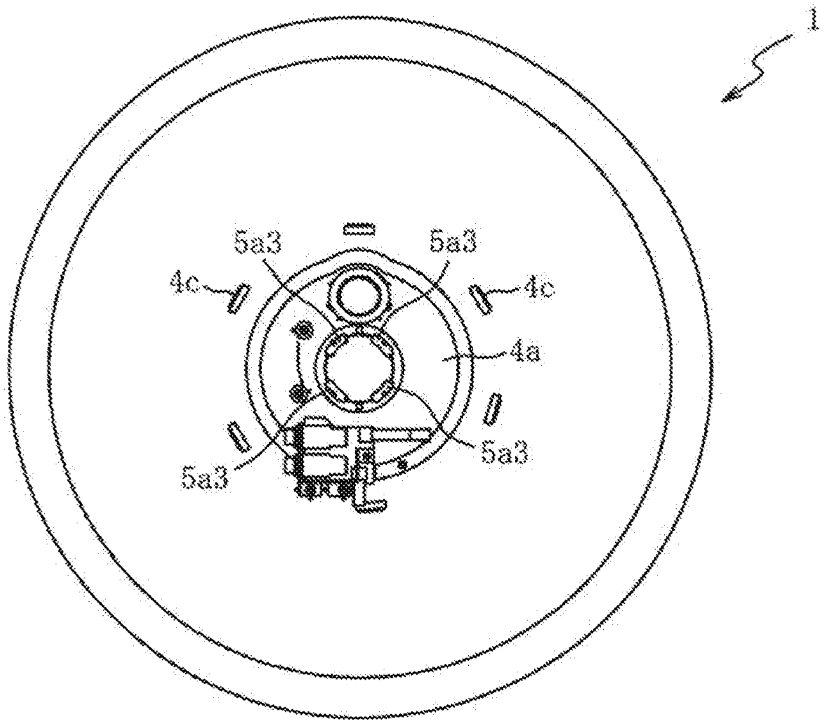

(a) of FIG. 5 is a bottom view of the electronic cymbal, and (b) of FIG. 5 is a bottom view of the electronic cymbal when the case is removed.

Figure 1:
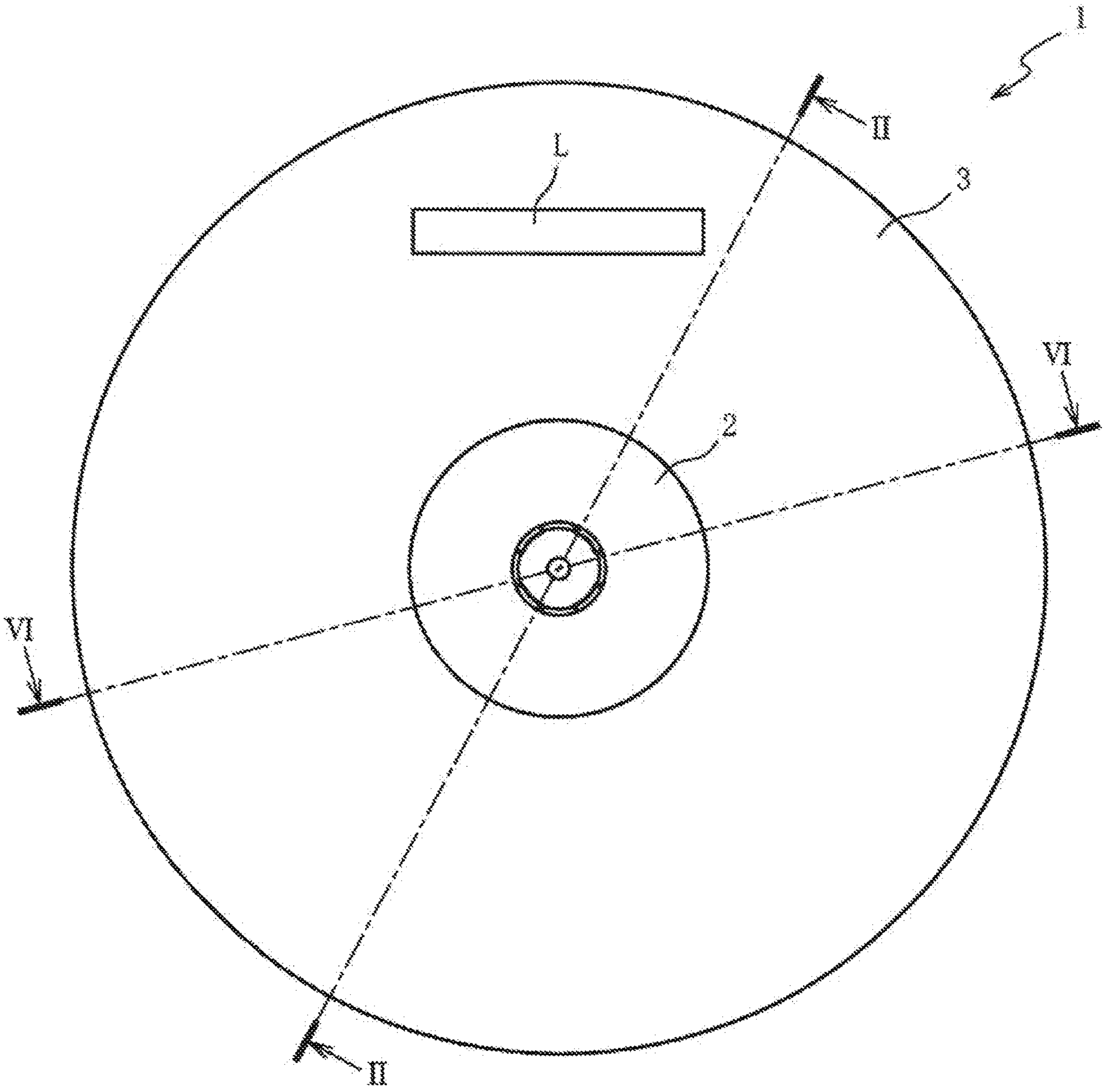
FIG. 1 is a top view of an electronic cymbal according to an embodiment.
Figure 6:
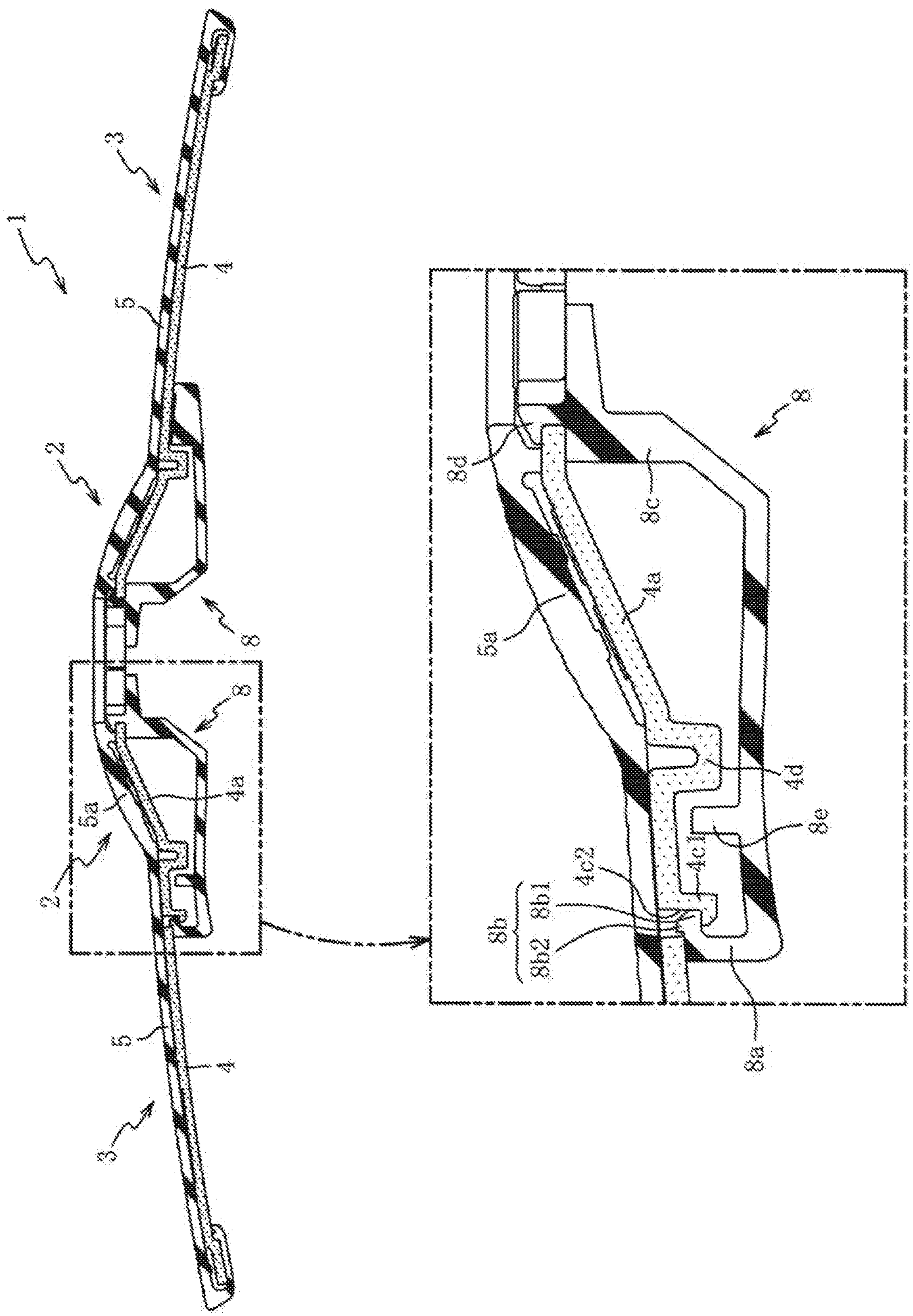

FIG. 6 is a sectional view of the electronic cymbal in a sectional line taken along VI-VI of FIG. 1.

Figure 7:
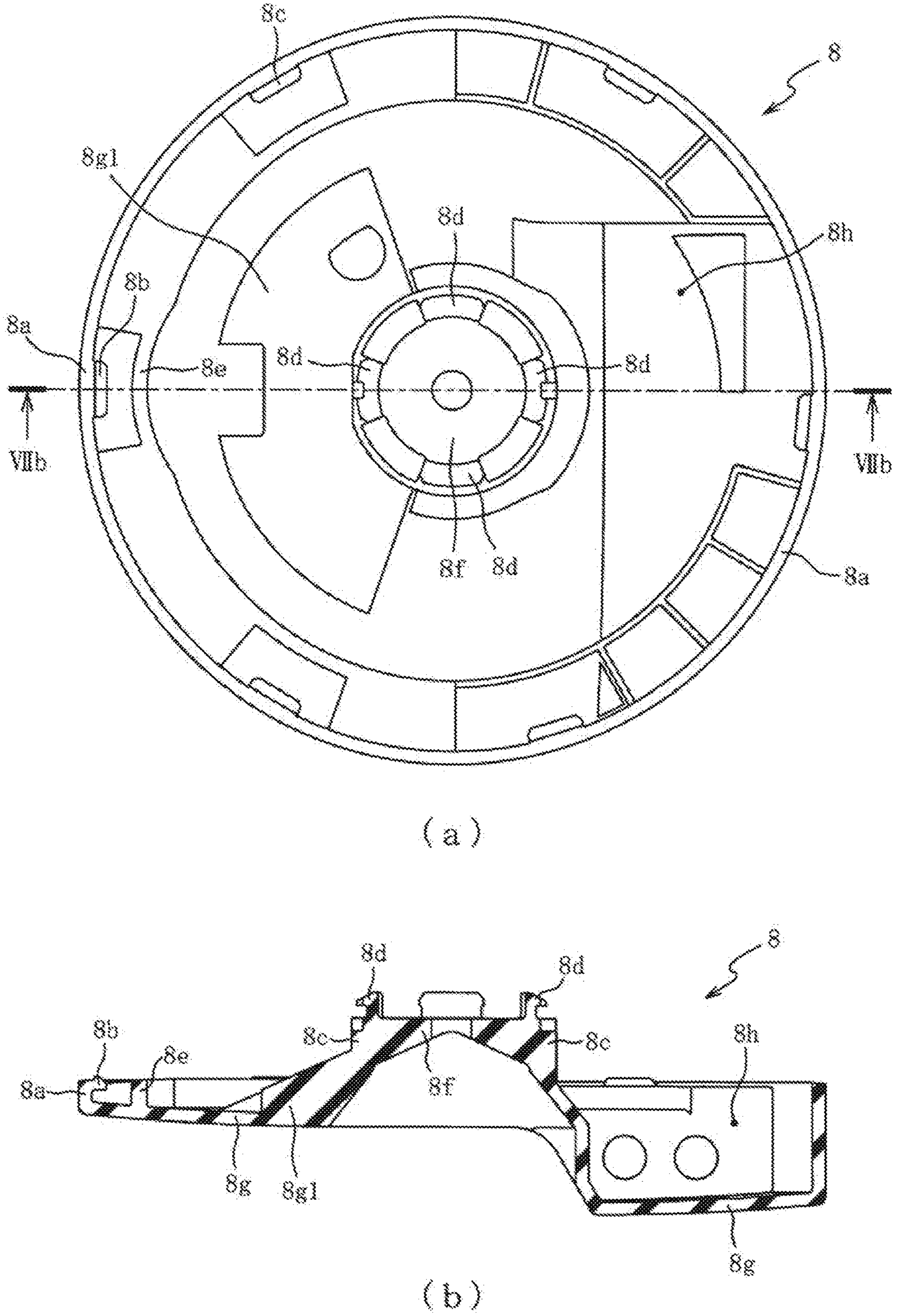

(a) of FIG. 7 is a top view of the case, and (b) of FIG. 7 is a sectional view of the case in a sectional line taken along VIIb-VIIb of (a) of FIG. 7.

Figure 8:
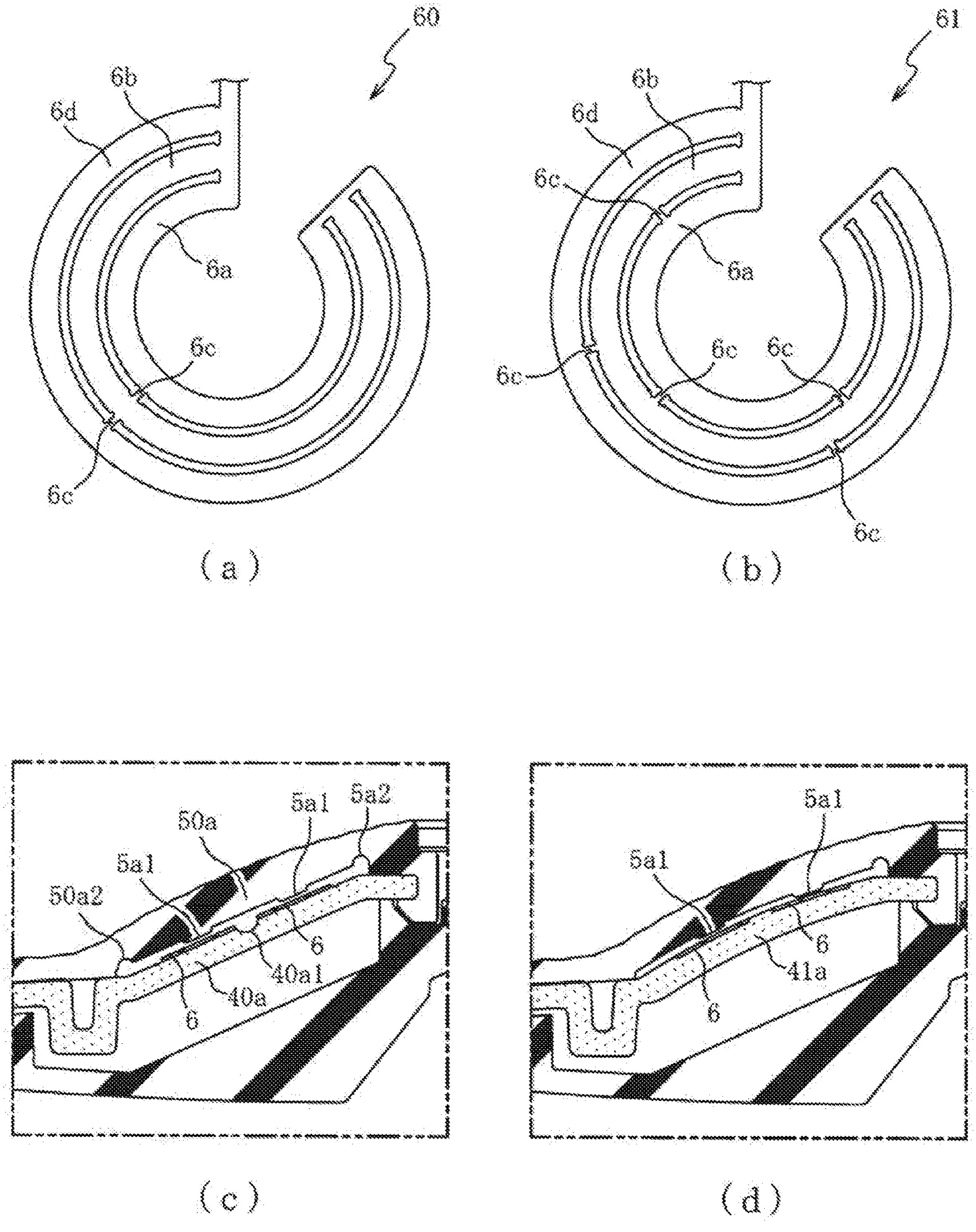

(a) of FIG. 8 is a top view of a bell portion sensor in the modification example, (b) of FIG. 8 is a top view of a bell portion sensor in another modification example, (c) of FIG. 8 is a sectional view of the electronic cymbal representing a frame in the modification example, and (d) of FIG. 8 is a sectional view of an electronic cymbal representing the frame in another modification example.

Figure 9:
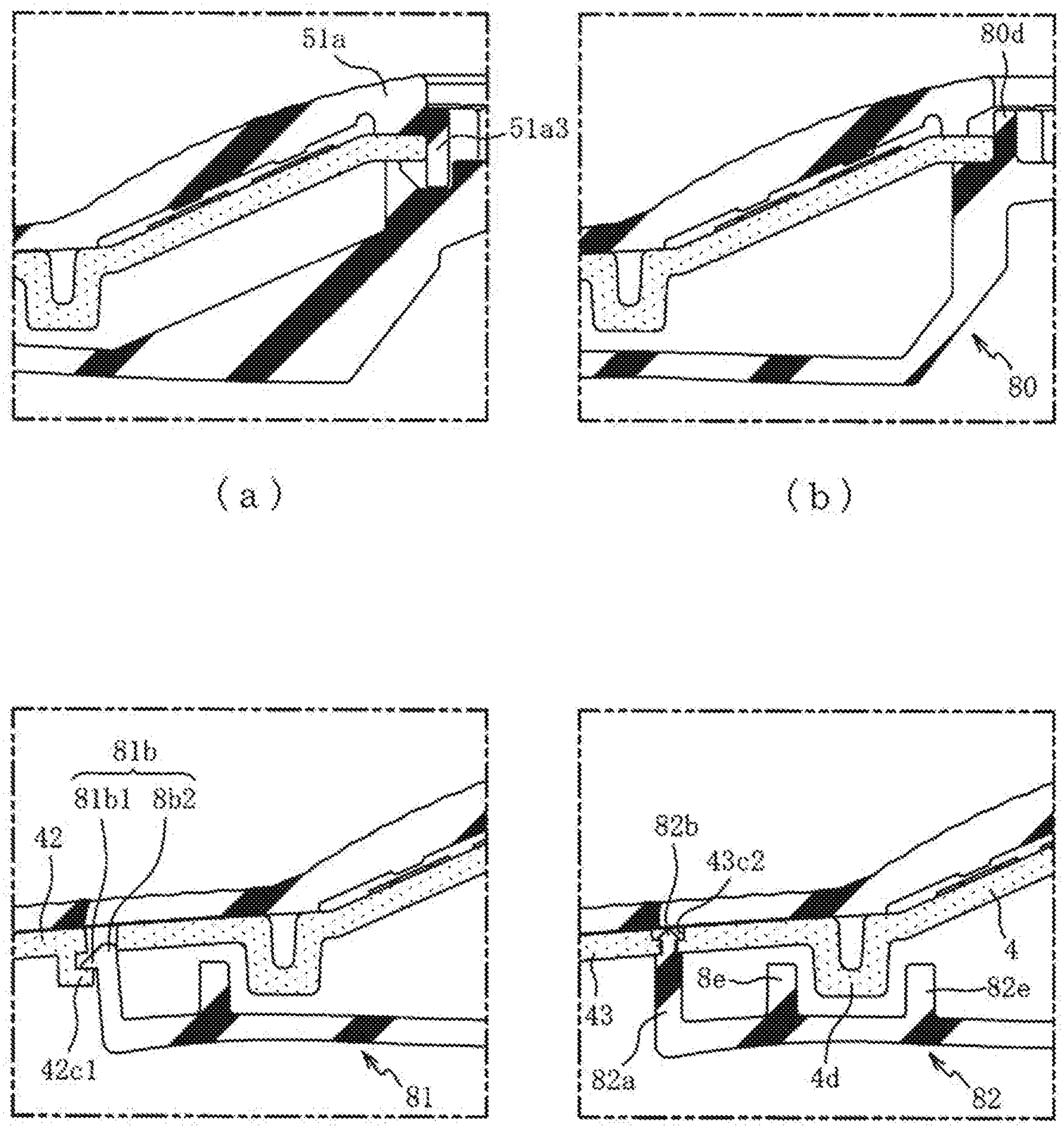

(a) of FIG. 9 is a sectional view of the electronic cymbal representing an engaging section in the modification example, (b) of FIG. 9 is a sectional view of the electronic cymbal representing an enclosing section in the modification example, (c) of FIG. 9 is a sectional view of the electronic cymbal representing a support section and a hooking section in the modification example, and (d) of FIG. 9 is a sectional view of an electronic cymbal representing a hooking section and a support column in another modification example.

Figure 10:
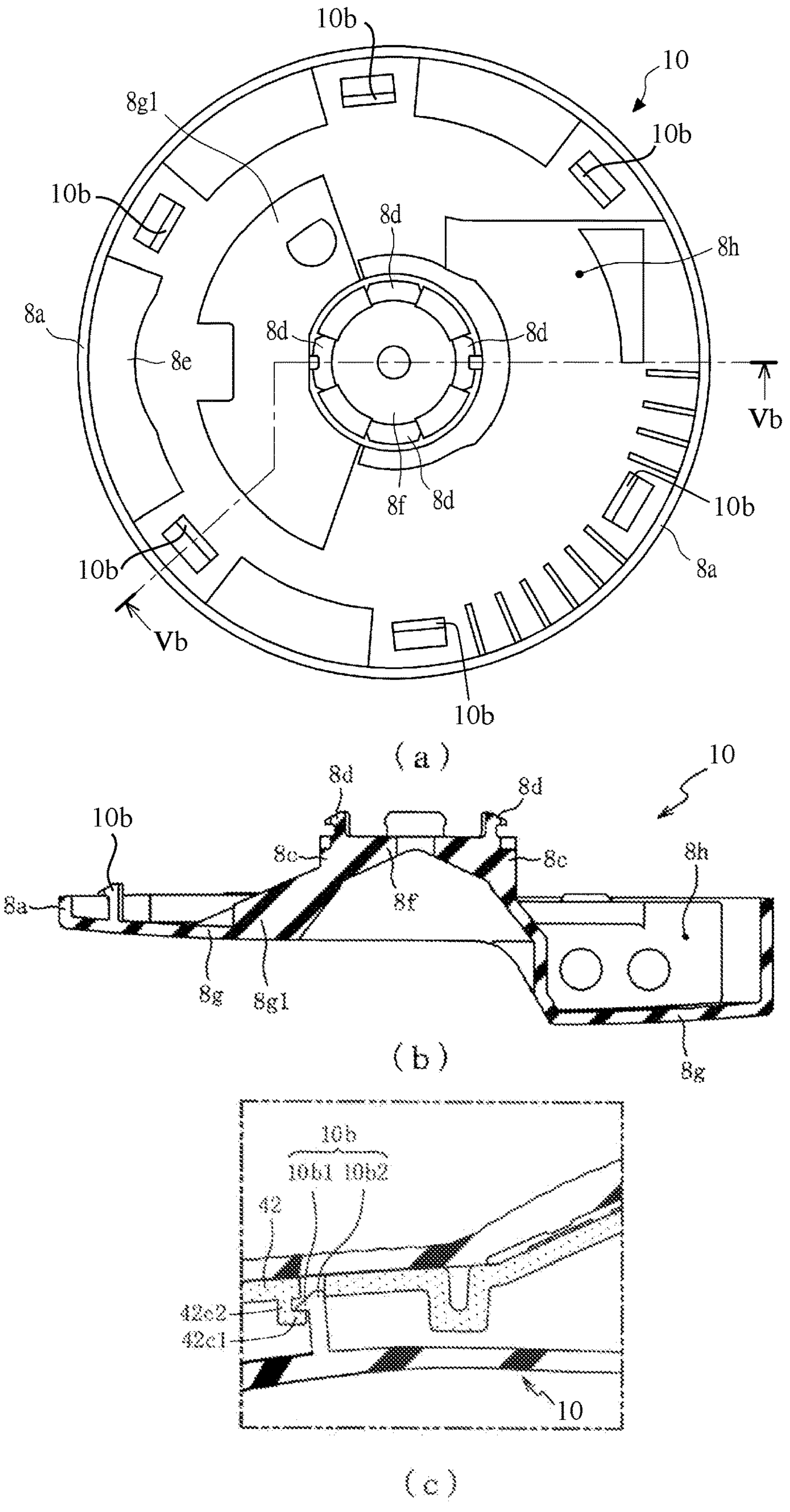

(a) of FIG. 10 is a top view of a case of an electronic cymbal in another modification example, (b) of FIG. 10 is a sectional view of the case in a sectional line taken along Vb-Vb of (a) of FIG. 10, and (c) of FIG. 10 is a sectional view of an electronic cymbal representing a hooking section and a support column of (a) of FIG. 10.

DESCRIPTION OF EMBODIMENTS

Hereinafter, preferred examples will be described with reference to the attached drawings. FIG. 1 is a top view of an electronic cymbal 1 of one embodiment. The electronic cymbal 1 is an electronic percussion instrument that imitates a cymbal, and is configured with a bell portion 2 having a circular shape in a top view provided at the center portion and a bow portion 3 provided on an outer side of the bell portion 2. A logo L on which the manufacturer name, product name, and the like are written is formed on the bow portion 3, and the performer plays by hitting the vicinity of the opposite side of the logo L with respect to the bell portion 2 on the upper surface of the bow portion 3.

When the bell portion 2 is hit by the performer with a stick or the like, the hit on the bell portion 2 is detected by a bell portion sensor 6 (which will be described later) in FIG. 2, and when the bow portion 3 is hit, the hit on the upper surface of the bow portion 3 is detected by a hit sensor (not illustrated). Further, when the outer edge (edge) part of the bow portion 3 is hit, the hit is detected by an edge portion sensor 7 (which will be described later) in FIG. 4. In other words, each of these sensors (the attaching structure of each sensor described later) configures a hit detection device in the electronic percussion instrument. The hit detected by the bell portion sensor 6, the hit sensor, and the edge portion sensor 7 is converted into an electric signal and input to a sound source device (not illustrated) to produce a musical sound corresponding to the hit on the bell portion 2 and the bow portion 3.

The structure of the electronic cymbal 1 will be described with reference to FIGS. 2 to 7. First, the attaching structure of the bell portion sensor 6 will be described. FIG. 2 is a sectional view of the electronic cymbal 1 in a sectional line taken along II-II of FIG. 1. As illustrated in FIG. 2, the electronic cymbal 1 includes a frame 4 made of reinforced plastic forming a skeleton, a cover 5, a bell portion sensor 6 and an edge portion sensor 7 provided on the upper surface of the frame 4, and a synthetic rubber case 8 that is provided on a bottom surface of the frame 4 and protects the electronic components of the electronic cymbal 1.

A frame bell portion 4*a* is formed at a position corresponding to the bell portion 2 in the frame 4, and a frame bow portion 4*b* is formed at a position corresponding to the bow portion 3 in the frame 4. The frame bow portion 4*b* is a part of the frame 4 that configures an outer peripheral side of the frame bell portion 4*a*, and is connected to the outer edge of the frame bell portion 4*a* via a restricting section 4*d* (refer to an enlarged part in FIG. 2) which will be described later. The side surface of the frame bell portion 4*a* is formed in a conical shape which is tapered upward, and the bell portion sensor 6 for detecting the hit of the bell portion 2 is adhered onto the side surface of the frame bell portion 4*a* with a double-sided tape.

The bell portion sensors 6 are formed in a sheet shape by pasting films made of polyethylene terephthalate (PET) coated with a conductive paste on the top and bottom such that the conductive pastes face each other. When the bell portion sensor 6 is pressed by the hit or the like and the upper and lower conductive pastes come into contact with each other, an electric signal is output from the bell portion sensor 6.

Since the side surface of the frame bell portion 4*a* is formed in a conical shape, the shape of the side surface in a cross section of the frame bell portion 4*a* is linear. By adhering the sheet-shaped bell portion sensor 6 to the frame bell portion 4*a*, the bell portion sensor 6 and the frame bell portion 4*a* can be brought into close contact with each other in the radial direction.

The cover 5 is a synthetic rubber member that covers the upper portion of the frame 4 and forms the hitting surface of the electronic cymbal 1. The cover 5 is adhered to the frame 4 with a double-sided tape, and specifically, the part corresponding to the bow portion 3 (refer to FIG. 1) on the upper surface of the frame 4 and the part corresponding to the bow portion 3 (refer to FIG. 1) of the cover 5 are adhered to each other with a double-sided tape.

A cover bell portion 5*a* that covers the frame bell portion 4*a* and the bell portion sensor 6 is formed at a position corresponding to the bell portion 2 on the cover 5, and a cover bow portion 5*b* that covers the frame bow portion 4*b* and the edge portion sensor 7 are formed at a position corresponding to the bow portion 3 on the cover 5. The surface of the cover bell portion 5*a*, that is, the surface hit by a stick or the like, is formed in a hemispherical shape (bowl shape) that is raised upward. Accordingly, the surface of the cover bell portion 5*a*, that is, the surface of the bell portion 2, can be made into a shape that matches the shape of the bell portion in an actual cymbal.

A raised projection portion 5*al* is formed on the back surface of the cover bell portion 5*a*, that is, on the surface facing the frame bell portion 4*a* and the bell portion sensor 6, and at a position facing the bell portion sensor 6. The surface (facing surface) of the projection portion 5*al* facing the bell portion sensor 6 is formed in a conical shape so as to match the shape of the frame bell portion 4*a* at the position where the bell portion sensor 6 is provided. Further, the projection portion 5*al* is formed such that the facing surface of the projection portion 5*a*1 faces the bell portion sensor 6 in parallel. In addition, the projection portion 5*al* is formed such that a gap is provided between the facing surface of the projection portion 5*al* and the upper surface of the bell portion sensor 6, and the size of the gap is set to 0.3 mm to 0.8 mm.

When the cover bell portion 5*a* is hit, the cover bell portion 5*a* bends, and the gap between the projection portion 5*al* and the bell portion sensor 6 disappears. Accordingly, the bell portion sensor 6 is pressed against the projection portion 5*al*, and the hit is transmitted to the bell portion sensor 6. At this time, the facing surface of the projection portion 5*al* is formed so as to match the shape of the frame bell portion 4*a* at the position where the bell portion sensor 6 is provided, and the facing surface of the projection portion 5*al* and the bell portion sensor 6 are formed to face each other in parallel. Therefore, the bell portion sensor 6 is pressed by the surfaces of the projection portion 5*al* and the frame bell portion 4*a*, which are parallel to each other. Accordingly, the upper and lower conductive pastes of the bell portion sensor 6 are pressed against each other in parallel from above and below, and thus the hit on the cover bell portion 5*a* can be appropriately transmitted to the bell portion sensor 6.

By forming a gap between the facing surface of the projection portion 5*al* and the bell portion sensor 6, contact between the projection portion 5*al* and the bell portion sensor 6 is suppressed when a part other than the cover bell portion 5*a*, for example, the bow portion 3, is hit. Accordingly, it is possible to suppress erroneous detection of the bell portion sensor 6 when a part other than the cover bell portion 5*a* is hit.

Furthermore, the gap between the facing surface of the projection portion 5*a*1 and the bell portion sensor 6 is set to 0.3 mm to 0.8 mm. Accordingly, even when the hit on the cover bell portion 5*a* is a weak hit (that is, the strength of the hit is weak), the projection portion 5*a*1 can be pushed into the bell portion sensor 6, and thus the hit sensitivity against the weak hit can be improved.

In the cover bell portion 5*a*, a recess 5*a*2 having a U shape in a sectional view is formed at a position further on the inner peripheral side of the inner peripheral projection portion 5*a*1. The recess 5*a*2 is deformed by the hit on the cover bell portion 5*a*, and the bending of the cover bell portion 5*a* can be increased. Accordingly, even when the hit on the cover bell portion 5*a* is weak, the bending of the cover bell portion 5*a* becomes large, and thus the hit can be appropriately transmitted to the bell portion sensor 6.

Further, the wall thickness of the cover bell portion 5*a* is formed such that the wall thickness of the part where the thickest projection portion 5*al* is formed is two times or less the wall thickness of the part where the thinnest recess 5*a*2 is formed. Accordingly, the increase in the wall thickness of the cover bell portion 5*a* is suppressed, and thus the elastic deformation of the cover bell portion 5*a* due to the hit on the cover bell portion 5*a* can be suppressed. Accordingly, the feel of hitting the cover bell portion 5*a* (feeling of hitting) can be made as hard as an actual cymbal.

On the inner peripheral side of the cover bell portion 5*a*, an engaging section 5*a*3 that engages the cover 5 with the frame 4 is formed by hooking the inner peripheral side of the frame bell portion 4*a*. The engaging sections 5*a*3 are formed at four locations on the inner peripheral side of the cover bell portion 5*a* (not illustrated), and the shape of the engaging section 5*a*3 is formed such that the engaging sections 5*a*3 are in contact with the upper surface, the bottom surface, and the side surface of the frame bell portion 4*a* when the engaging section 5*a*3 is hooked on the inner peripheral side of the frame bell portion 4*a*.

As described above, the part corresponding to the bow portion 3 (refer to FIG. 1) on the upper surface of the frame 4 and the position corresponding to the bow portion 3 of the cover 5 are adhered with a double-sided tape. At this time, the position is adjusted such that, first, the bell portion sensor 6 is disposed on the frame bell portion 4*a*, then the engaging section 5*a*3 is hooked on the inner peripheral side of the frame bell portion 4*a*, and the projection portion 5*a*1 is on the bell portion sensor 6.

After this, the parts of the frame 4 and the cover 5 corresponding to the bow portion 3 are adhered in order from the inner peripheral side to the outer peripheral side of the cover 5. Here, since the cover 5 is engaged with the inner peripheral side of the frame bell portion 4*a* by the engaging section 5*a*3, the movement of the cover 5 in the outer peripheral direction is restricted. Accordingly, the frame 4 and the cover 5 can be adhered while maintaining the positional relationship between the projection portion 5*al* and the bell portion sensor 6.

Next, the shapes of the bell portion sensor 6 and the edge portion sensor 7 will be described with reference to FIG. 3. (a) of FIG. 3 is a side view of the electronic cymbal 1 where the cover 5 is not illustrated, and (b) of FIG. 3 is a top view of the electronic cymbal 1 where the cover 5 is not illustrated. In (a) of FIG. 3, the edge portion sensor 7 (refer to (b) of FIG. 3) is not illustrated in order to simplify the drawing. As illustrated in (a) of FIG. 3, the sheet-shaped bell portion sensor 6 is deformed into a conical shape and adhered to the frame bell portion 4*a* such that the side surface matches the shape of the conical frame bell portion 4*a*.

As illustrated in (b) of FIG. 3, the shape of the bell portion sensor 6 is formed in an arc shape in a top view. The bell portion sensor 6 is separated into two in the radial direction thereof, and specifically includes an inner peripheral sensor 6*a* that forms the inner peripheral side of the bell portion sensor 6 and an outer peripheral sensor 6*b* that forms the outer peripheral side. The widths of the inner peripheral sensor 6*a* and the outer peripheral sensor 6*b* in the radial direction are formed to be substantially the same. In addition, "substantially the same" means that variations in the manufacturing process, materials, and measurements are allowed. Specifically, "substantially the same" or "substantially constant" is defined as a range of ±10%, and the same applies to the following description.

By separating the bell portion sensor 6 into the inner peripheral sensor 6*a* and the outer peripheral sensor 6*b*, the widths of each in the radial direction is reduced. As described above, the bell portion sensor 6 is bent and adhered according to the shape (conical shape) of the side surface of the frame bell portion 4*a*, but the amount of deformation due to the bending of each of the inner peripheral sensor 6*a* and the outer peripheral sensor 6*b* is smaller than that in a case where the sensor 6 is formed as one sensor. Therefore, a repulsive force (restoring force) that the bent inner peripheral sensor 6*a* and the outer peripheral sensor 6*b* try to return to the original sheet shape becomes smaller than that in a case where the bell portion sensor 6 is formed as one sensor.

Accordingly, it is possible to suppress a case where the inner peripheral sensor 6*a* and the outer peripheral sensor 6*b* adhered to the frame bell portion 4*a* are peeled off from the frame bell portion 4*a*. In particular, it is possible to suppress a case where the inner peripheral sensor 6*a* and the outer peripheral sensor 6*b* are peeled off when the bell portion 2 is hit or when the temperature or humidity changes significantly due to an environmental test or the like. Further, by reducing the amount of deformation when the inner peripheral sensor 6*a* and the outer peripheral sensor 6*b* are bent, it is possible to suppress a case where the upper and lower films coated with the conductive paste are peeled off in the inner peripheral sensor 6*a* and the outer peripheral sensor 6*b*.

Further, as illustrated in (b) of FIG. 3, the bell portion sensor 6 is formed in an arc shape (C shape) in which a part is disconnected in a top view, and is provided on the frame bell portion 4*a* such that the disconnected part in the bell portion sensor 6 is on the logo L side. This is because, when the performer strongly hits the bow portion 3 (refer to FIG. 1) on the opposite side of the logo L with respect to the bell portion 2, the electronic cymbal 1 moves up and down significantly due to the reaction, and a strut (not illustrated) provided at the center of the bell portion 2 comes into contact with the logo L side of the bell portion 2. Therefore, in the frame bell portion 4*a*, the bell portion sensor 6 is not formed with respect to the side where the logo L is provided, and accordingly, even when the strut comes into contact with the bell portion 2, it is possible to suppress erroneous detection of the contact as a hit on the bell portion 2.

The bell portion sensor 6 is provided with a connecting section 6*c* for connecting the outer peripheral side of the inner peripheral sensor 6*a* and the inner peripheral side of the outer peripheral sensor 6*b*. In the present embodiment, the connecting sections 6*c* are provided at three locations, that is, both ends of the inner peripheral sensor 6*a* and the outer peripheral sensor 6*b* in the peripheral direction, and a substantially intermediate position between the inner peripheral sensor 6*a* and the outer peripheral sensor 6*b* in the peripheral direction.

By connecting the outer peripheral side of the inner peripheral sensor 6*a* and the inner peripheral side of the outer peripheral sensor 6*b* with each other at the connecting section 6*c*, the positional relationship between the inner peripheral sensor 6*a* and the outer peripheral sensor 6*b* is maintained. Accordingly, it is possible to improve the workability and the accuracy of alignment when the bell portion sensor 6 is provided, and it is possible to suppress the positional deviation between the inner peripheral sensor 6*a* and the outer peripheral sensor 6*b* in the peripheral direction when being hit. In addition, the connecting sections 6*c* are arranged at three locations of the inner peripheral sensor 6*a* and the outer peripheral sensor 6*b* in the peripheral direction at substantially even intervals. Accordingly, the positional deviation between the inner peripheral sensor 6*a* and the outer peripheral sensor 6*b* in the peripheral direction can be more preferably suppressed.

As illustrated in (b) of FIG. 3, the edge portion sensor 7 includes a connecting section 7*a* that extends from the frame bell portion 4*a* toward the outer peripheral side, and an edge sensor 7*b* connected to the outer peripheral end of the connecting section 7*a*. The edge sensor 7*b* is formed in an arc shape (C shape) in which a part is disconnected in a top view, and is adhered to the outer edge part of the frame 4 in a posture in which the disconnected part faces the logo L side. Accordingly, the hit on the outer edge (edge) part of the electronic cymbal 1 is detected by the edge sensor 7*b*. The sensor structure of the edge sensor 7*b* has the same configuration as that of the above-described bell portion sensor 6. Accordingly, when the edge sensor 7*b* is pressed by the hit or the like and the upper and lower conductive pastes come into contact with each other, an electric signal is output from the edge portion sensor 7.

Next, with reference to FIG. 4, the attaching structure of the edge portion sensor 7 and the hit detection method will be described. (a) of FIG. 4 is a partially enlarged sectional view of the electronic cymbal in which a IVa part of FIG. 2 is enlarged, and (b) of FIG. 4 is a partially enlarged sectional view of the electronic cymbal 1 illustrating a state of being hit by a stick from the state of (a) of FIG. 4. In FIG. 4, only the cross-sectional part of the electronic cymbal 1 is illustrated in order to simplify the drawing. Further, in (a) of FIG. 4, bonding regions R1 and R2 between the frame bow portion 4*b* and the cover bow portion 5*b* are exaggerated and schematically illustrated, and in (b) of FIG. 4, the bonding regions R1 and R2 are not illustrated.

The frame bow portion 4*b* has a main body portion 4*b*1 that gently descends and inclines from the outer edge of the frame bell portion 4*a* (refer to FIG. 2) toward the outer peripheral side (outward in the radial direction), a bent portion 4*b*2 that bends downward from the outer edge of the main body portion 4*b*1, and an outer peripheral portion 4*b*3 that protrudes from the lower end side of the bent portion 4*b*2 toward the outer peripheral side, and is formed in a disk shape. In other words, the main body portion 4*b*1, the bent portion 4*b*2, and the outer peripheral portion 4*b*3 that configure the frame bow portion 4*b* are each continuously formed in the peripheral direction.

The main body portion 4*b*1 is a part that forms the skeleton of the main body part of the bow portion 3 (refer to FIG. 2), and the outer peripheral portion 4*b*3 is a part that forms the skeleton of the outer edge part of the bow portion 3. The thickness dimensions (plate thickness) of the main body portion 4*b*1 and the outer peripheral portion 4*b*3 are respectively set to be substantially the same, and the main body portion 4*b*1 and the outer peripheral portion 4*b*3 are vertically connected to each other by the bent portion 4*b*2. Accordingly, the upper surface of the outer peripheral portion 4*b*3 is positioned below the upper surface of the main body portion 4*b*1, and the lower surface of the outer peripheral portion 4*b*3 is also positioned below the lower surface of the main body portion 4*bl*.

The edge sensor 7*b* is adhered to the upper surface of the outer peripheral portion 4*b*3 with a double-sided tape, and the cover bow portion 5*b* covers the frame bow portion 4*b* in a state where a space S capable of accommodating the edge sensor 7*b* is formed. In the following description, the space S formed between the upper surface of the outer peripheral portion 4*b*3 and the lower surface of the cover bow portion 5*b* in the state before the hit (state in (a) of FIG. 4) is simply described as "space S" in the description.

The cover bow portion 5*b* includes an upper cover portion 5*b*1 that covers the upper surface of the frame bow portion 4*b*, and a lower cover portion 5*b*2 that is connected to the outer edge of the upper cover portion 5*b*1 and covers from the outer edge of the frame bow portion 4*b* to the edge portion of the lower surface. In the state before the hit, in addition to the space S, a space (the one connected to the space S) is also formed in the region between the lower cover portion 5*b*2 and the outer peripheral surface of the outer peripheral portion 4*b*3.

A raised projection portion 5*b*3 that protrudes toward the edge sensor 7*b* is formed on the lower surface of the upper cover portion 5*b*1, and a gap is formed between the tip end of the projection portion 5*b*3 and the edge sensor 7*b*. Accordingly, when the outer edge part of the upper cover portion 5*b*1 is hit (refer to (b) of FIG. 4), the projection portion 5*b*3 is pressed against the edge sensor 7*b* by the elastic deformation (bending) of the upper cover portion 5*b*1 toward the space S, and thus the hit is detected by the edge sensor 7*b*.

In a state before hitting, a gap is formed between the tip end surface of the projection portion 5*b*3 and the edge sensor 7*b*, and accordingly, when a part other than the cover bow portion 5*b*, for example, the bell portion 2 (refer to FIG. 2) is hit, it is possible to suppress a case where the projection portion 5*b*3 is pushed into the edge sensor 7*b*. Accordingly, when a part other than the outer edge of the cover bow portion 5*b* is hit, it is possible to suppress erroneous detection of the hit by the edge sensor 7*b*.

In this manner, the projection portion 5*b*3 is configured to be pushed into the edge sensor 7*b* by the elastic deformation of the upper cover portion 5*b*1 at the time of a hit, but the lower cover portion 5*b*2 is connected to the outer edge of the upper cover portion 5*b*1. Accordingly, the lower cover portion 5*b*2 also elastically deforms with the elastic deformation of the upper cover portion 5*b*1 (refer to (b) of FIG. 4). In the present embodiment, the lower cover portion 5*b*2 is formed to easily elastically deform even when the hit is weak. This configuration will be described below.

From the inner edge of the lower cover portion 5*b*2 (the end portion on the right side in (a) of FIG. 4), a bonding section 5*b*4 that protrudes toward the lower surface of the main body portion 4*b*1 of the frame bow portion 4*b* is formed. The bonding section 5*b*4 is bonded with an adhesive from the inner peripheral surface of the bent portion 4*b*2 of the frame bow portion 4*b* to the lower surface of the main body portion 4*b*1. Meanwhile, on the outer peripheral side (left side of (a) of FIG. 4) of the bonding region R1 (hereinafter, simply described as "bonding region R1") between the bonding section 5*b*4 and the frame bow portion 4*b*, the upper surface of the lower cover portion 5*b*2 is not bonded to the lower surface of the bent portion 4*b*2 or the outer peripheral portion 4*b*3. In this non-bonded region, the lower surfaces of the bent portion 4*b*2 and the outer peripheral portion 4*b*3 and the upper surface of the lower cover portion 5*b*2 are flat surfaces, respectively. Accordingly, between the lower surface of the frame bow portion 4*b* and the upper surface of the lower cover portion 5*b*2, a hook that hinders the deformation of the lower cover portion 5*b*2 toward the inner peripheral side (inward in the radial direction) is not formed.

In other words, on the lower surface side of the frame bow portion 4*b*, in a state where the deformation of the lower cover portion 5*b*2 toward the inner peripheral side or downward is allowed, the inner edge side of the lower cover portion 5*b*2 is bonded to the lower surface of the frame bow portion 4*b* via the bonding section 5*b*4. Accordingly, it is possible to suppress a case where the elastic deformation of the lower cover portion 5*b*2 is restrained by the frame bow portion 4*b*, and thus the lower cover portion 5*b*2 can be easily elastically deformed when the outer edge part of the upper cover portion 5*b*1 is hit.

Further, since the bonding region R1 is positioned on the inner peripheral side (right side of (a) of FIG. 4) of the space S (edge sensor 7*b*), a region where the lower surface of the frame bow portion 4*b* and the lower cover portion 5*b*2 are not bonded to each other can be formed to be long in the radial direction. Accordingly, the movable range of the lower cover portion 5*b*2 can be widened, and thus the lower cover portion 5*b*2 can be easily elastically deformed.

Furthermore, the thickness dimension (wall thickness) of the lower cover portion 5*b*2 is formed to be smaller than the thickness dimension of the upper cover portion 5*b*1. More specifically, a thickness dimension L1 of the lower cover portion 5*b*2 in the region facing the lower surface of the outer peripheral portion 4*b*3 (and the bent portion 4*b*2) of the frame bow portion 4*b* (refer to (a) of FIG. 4) is formed to be smaller than a thickness dimension L2 of the upper cover portion 5*b*1 in the region facing the upper surface (space S) of the outer peripheral portion 4*b*3. Accordingly, when the outer edge part of the upper cover portion 5*b*1 is hit, the lower cover portion 5*b*2 can be easily elastically deformed.

In this manner, by making the lower cover portion 5*b*2 easily elastically deformed, the projection portion 5*b*3 can be reliably pushed into the edge sensor 7*b* even when the hit on the upper cover portion 5*b*1 is weak. Accordingly, the hit detection accuracy can be improved.

In the present embodiment, the thickness dimension L1 of the lower cover portion 5*b*2 is substantially constant from the inner peripheral side to the outer peripheral side in the region facing the lower surface of the outer peripheral portion 4*b*3 (and the bent portion 4*b*2). With this configuration, the lower cover portion 5*b*2 can be elastically deformed to be bent, but the present invention is not limited thereto. For example, in the region facing the lower surface of the outer peripheral portion 4*b*3 or the bent portion 4*b*2, the thickness dimension of a part of the lower cover portion 5*b*2 may be formed to be thin and deformed so as to be bent at the thin part. Accordingly, the lower cover portion 5*b*2 can be more easily elastically deformed.

Here, in the present embodiment, a recessed portion (step) is formed at the outer edge part of the upper surface of the frame bow portion 4*b*, and the space S is formed by the recessed portion, but as described in the related art (for example, Japanese Patent Laid-Open No. 2009-145559), it is also possible to form the space S by providing a recessed portion (step) on the lower surface of the upper cover portion 5*b*1.

However, when the recessed portion is provided on the upper cover portion 5*b*1 side, the thickness of the upper cover portion 5*b*1 becomes thinner as much as the recessed portion, and thus a part of the upper cover portion 5*b*1 is deformed to be bent at the time of a hit, and there is a concern that the protruding portion 5*b*3 cannot be appropriately pushed into the edge sensor 7*b*. When the thickness of the upper cover portion 5*b*1 is increased in the region facing the space S in order to solve this problem, according to the increase, it is also necessary to increase the thickness of the upper cover portion 5*b*1 on the inner peripheral side of the space S. In other words, in the configuration in which the recessed portion is provided on the upper cover portion 5*b*1 side to form the space S, it becomes difficult to achieve both reducing the thickness of the cover bow portion 5*b* and accurately detecting the hit on the upper cover portion 5*b*1.

On the other hand, in the present embodiment, the frame bow portion 4*b* has the bent portion 4*b*2 that bends downward from the outer edge of the main body portion 4*b*1, and the outer peripheral portion 4*b*3 that protrudes from the lower end side of the bent portion 4*b*2 toward the outer peripheral side, and has the edge sensor 7*b* disposed on the upper surface. Accordingly, a recessed portion can be formed by the step between the bent portion 4*b*2 and the outer peripheral portion 4*b*3, and the space S can be formed by using the recessed portion. Therefore, as compared with a case where the recessed portion is provided on the upper cover portion 5*b*1 side to form the space S, the thickness of the upper cover portion 5*b*1 in the region facing the space S can be ensured while reducing the thickness of the entire cover bow portion 5*b*. In other words, it is possible to achieve both reducing the thickness of the cover bow portion 5*b* and accurately detecting the hit on the upper cover portion 5*b*1. Furthermore, since the step is formed in the cover bow portion 5*b* by the bent portion 4*b*2 and the outer peripheral portion 4*b*3, the rigidity of the outer edge portion of the cover bow portion 5*b* can be increased.

Further, since the bonding section 5*b*4 that protrudes toward the lower surface of the main body portion 4*b*1 is formed on the inner edge side of the lower cover portion 5*b*2, the bonding section 5*b*4 can be hooked by using the step formed by the bent portion 4*b*2 and the outer peripheral portion 4*b*3. Accordingly, the displacement of the lower cover portion 5*b*2 toward the outer peripheral side can be restricted by the hooking between the inner peripheral surface of the bent portion 4*b*2 and the bonding section 5*b*4, and thus it is possible to suppress a case where the force toward the outer peripheral side is applied to the bonding region R1. Therefore, peeling of the adhesion in the bonding region R1 can be suppressed.

Meanwhile, when the upper cover portion 5*b*1 is hit, a force toward the inner peripheral side is applied to the bonding region R1, but in the present embodiment, the force can also be reduced. In other words, the thickness dimension L1 of the lower cover portion 5*b*2 in the region facing the lower surface of the outer peripheral portion 4*b*3 (and the bent portion 4*b*2) is formed to be smaller than the thickness dimension L3 of the bonding section 5*b*4. Accordingly, only the lower cover portion 5*b*2 can be easily elastically deformed when the upper cover portion 5*b*1 is hit, and thus it is possible to suppress a case where the force toward the inner peripheral side at the time of a hit is applied to the bonding region R1. Therefore, peeling of the adhesion in the bonding region R1 can be suppressed.

Further, the bonding region R1 is a connecting part between the inner peripheral surface of the bent portion 4*b*2 and the lower surface of the main body portion 4*b*1 and is positioned above the lower end of the inner peripheral surface of the bent portion 4*b*2. Accordingly, it is possible to suppress a case where the adhesive for bonding the bonding section 5*b*4 to the frame bow portion 4*b* flows out between the lower surface of the outer peripheral portion 4*b*3 and the upper surface of the lower cover portion 5*b*2. Therefore, it is possible to suppress narrowing of the movable range of the lower cover portion 5*b*2. Further, since a recessed portion 5*b*5 recessed downward is formed on the upper surface of the bonding section 5*b*4 on the inner peripheral side of the bonding region R1, it is possible to suppress a case where the adhesive flows out to the inner peripheral side of the bonding section 5*b*4. Accordingly, it is possible to suppress a decrease in the bonding force between the frame bow portion 4*b* and the bonding section 5*b*4 and improve the appearance of the electronic cymbal 1.

Here, as described above, in order to accurately detect the hit on the upper cover portion 5*b*1, the upper cover portion 5*b*1 needs to have a predetermined thickness in the region facing the space S. This is because it is necessary to deform the entire upper cover portion 5*b*1 to be bent at the time of a hit (refer to (b) of FIG. 4). In other words, when the thickness of the upper cover portion 5*b*1 is partially formed to be thin in the region facing the space S as described in the related art (for example, Japanese Patent Laid-Open No. 2009-145559), there is a concern that the thin part is deformed to be bent at the time of a hit. Accordingly, there is a concern that it is not possible to accurately detect the hit on the upper cover portion **5*b*1**.

On the other hand, in the present embodiment, in the region facing the upper surface of the outer peripheral portion **4*b*3 of the frame bow portion 4*b* (the recessed portion formed by the step of the bent portion 4*b*2 and the outer peripheral portion 4*b*3), the thickness dimension L2 of the upper cover portion 5*b*1 is substantially constant from the inner peripheral side to the outer peripheral side. Accordingly, the entire upper cover portion 5*b*1 can be easily deformed to be bent at the time of a hit, and thus the projection portion 5*b*3 can be reliably pushed into the edge sensor 7*b* by the deformation of the upper cover portion 5*b*1. Therefore, the hit on the upper cover portion 5*b*1** can be accurately detected.

Further, the upper cover portion **5*b*1 is bonded to the upper surface of the frame bow portion 4*b* (main body portion 4*b*1) on the inner peripheral side of the outer edge of the upper surface of the bent portion 4*b*2. In other words, on the outer peripheral side of the bonding region R2 between the upper cover portion 5*b*1 and the upper surface of the frame bow portion 4*b*, the upper cover portion 5*b*1 is not bonded to the upper surface of the frame bow portion 4*b* (the main body portion 4*b*1 and the bent portion 4*b*2). Accordingly, the upper cover portion 5*b*1 (a part that is not bonded to the upper surface of the frame bow portion 4*b***) is easily deformed so as to extend toward the outer peripheral side at the time of a hit.

Furthermore, the thickness dimension L2 of the upper cover portion **5*b*1 is substantially constant from the region not bonded to the upper surface of the frame bow portion 4*b* to the region facing the upper surface of the outer peripheral portion 4*b*3. Accordingly, for example, the upper cover portion 5*b*1 is more easily deformed so as to extend toward the outer peripheral side as compared with a case where the thickness dimension of the upper cover portion 5*b*1 is partially formed to be thicker. In this manner, by making the upper cover portion 5*b*1 easily elastically deformed toward the outer peripheral side, the projection portion 5*b*3 can be reliably pushed into the edge sensor 7*b* even when the hit on the upper cover portion 5*b*1** is weak. Accordingly, it is possible to improve the detection accuracy for a weak hit.

Further, in the region facing the upper surface of the outer peripheral portion **4*b*3, the thickness dimension L2 of the upper cover portion 5*b*1 is substantially constant, and the upper surface of the outer peripheral portion 4*b*3 and the lower surface of the upper cover portion 5*b*1 (the region where the projection portion 5*b*3 is not formed) are parallel. Accordingly, the thickness dimension from the upper surface of the outer peripheral portion 4*b*3 to the upper surface of the upper cover portion 5*b*1 can be made as small as possible, and the entire upper cover portion 5*b*1** can be easily deformed to be bent at the time of a hit.

Next, the case 8 provided on the frame 4 and the attaching structure of the case 8 will be described with reference to FIGS. 5 and 6. (a) of FIG. 5 is a bottom view of the electronic cymbal 1, and (b) of FIG. 5 is a bottom view of the electronic cymbal 1 when the case 8 is removed. As illustrated in (a) of FIG. 5, the case 8 is provided on the bottom surface of the frame 4.

As illustrated in (b) of FIG. 5, a frame-side attaching section **4*c* for fitting the case 8 is formed on the bottom surface of the frame 4 and outside the frame bell portion 4*a***.

In the present embodiment, the frame-side attaching sections **4*c* are formed at six locations in the peripheral direction with respect to the outer side of the frame bell portion 4*a*. With reference to FIG. 6, the structure of the frame-side attaching section 4*c* and the fitting structure of the case 8 with respect to the frame-side attaching section 4*c*** will be described.

FIG. 6 is a sectional view of the electronic cymbal 1 in a sectional line taken along VI-VI of FIG. 1. As illustrated in FIG. 6, the frame-side attaching section **4*c* is configured with a support section 4*c*1 and a projection accommodating section 4*c*2. The support section 4*c*1 is provided on the bottom surface of the frame 4 and is a part formed in an L shape in a cross-sectional view. The L-shaped open portion in the support section 4*c*1 is formed toward the outer peripheral side of the frame 4**.

The projection accommodating section **4*c*2 is a hole provided adjacent to the outer peripheral side of the support section 4*c*1 and formed to penetrate the frame 4. The outer peripheral end portion in frame 4 of the projection accommodating section 4*c*2 is formed on the outer side of the outer peripheral end portion in the frame 4 of the support section 4*c*1**.

On a wall-shaped case outer wall **8*a* that forms the outer peripheral side of the case 8, a hooking section 8*b*, which is a part for fitting the frame-side attaching section 4*c*, is formed. The hooking section 8*b* is provided at the upper portion of the inner peripheral surface of the case outer wall 8*a*, and is formed in an arrow shape in a cross-sectional view. Specifically, a tapered tip end portion 8*b*1 is formed on the inner peripheral side (right side of the paper surface in FIG. 6) of the hooking section 8*b*, and a protruding portion 8*b*2 that protrudes upward (toward the frame 4) on the outer peripheral side (left side of the paper surface in FIG. 6) of the tip end portion 8*b*1 is formed. Further, the length of the bottom surface of the hooking section 8*b* and the upper surface of the protruding portion 8*b*2 is formed to be larger than the length of the upper surface of the support section 4*c*1 of the frame-side attaching section 4*c* and the bottom surface of the frame 4**.

The fitting of the frame-side attaching section **4*c* and the hooking section 8*b* will be described. First, the hooking section 8*b* is inserted between the support section 4*c*1 and the projection accommodating section 4*c*2 of the frame-side attaching section 4*c*. At this time, since the tip end portion 8*b*1 of the hooking section 8*b* is formed in a tapered shape, the hooking section 8*b* can be smoothly inserted between the support section 4*c*1 and the projection accommodating section 4*c*2. Here, the length between the bottom surface of the hooking section 8*b* and the part that protrudes upward is formed to be larger than the length between the support section 4*c*1 and the bottom surface of the frame 4, but when the hooking section 8*b* is inserted between the support section 4*c*1 and the projection accommodating section 4*c*2, the synthetic rubber protruding portion 8*b*2 elastically deforms between the upper surface of the support section 4*c*1 and the bottom surface of the frame 4, and accordingly, the hooking section 8*b* can be inserted between the support section 4*c*1 and the projection accommodating section 4*c*2**.

Furthermore, when the tip end portion **8*b*1 is inserted until coming into contact with the support section 4*c*1, the protruding portion 8*b*2 is fitted into the projection accommodating section 4*c*2. Accordingly, the hooking section 8*b* is fitted into the frame-side attaching section 4*c*. By fitting the hooking section 8*b* into the frame-side attaching section 4*c* in this manner, the movement of the case 8 in the inner peripheral direction can be restricted by the tip end portion 8*b*1 which is in contact with the support section 4*c*1. Further, the downward movement of the case 8 can be restricted by the bottom surface of the hooking section 8***b* which is in contact with the upper surface of the support section 4*c*1. Accordingly, it is possible to suppress falling of the hooking section 8*b* from the frame-side attaching section 4*c*, and thus it is possible to suppress falling of the case outer wall 8*a* from the frame 4.

Next, the fitting structure to the frame bell portion 4*a* on the inner peripheral side of the case 8 will be described. As illustrated in FIG. 6, an enclosing section 8*d* that encloses the inner peripheral side of the frame bell portion 4*a* is formed at the upper portion of the wall-shaped case inner wall 8*c* that forms the inner peripheral side of the case 8. When the enclosing section 8*d* is hooked on the inner peripheral side of the frame bell portion 4*a*, the enclosing section 8*d* is formed so as to be in contact with the upper surface, the bottom surface, and the side surface on the inner peripheral side of the enclosing section 8*d* and the frame bell portion 4*a*. Further, the enclosing section 8*d* are formed at four locations at the upper portion of the case inner wall 8*c*.

By enclosing the inner peripheral side of the frame bell portion 4*a* with the enclosing section 8*d*, the case inner wall 8*c* is fitted into the frame bell portion 4*a*. Since the inner peripheral surface of the frame bell portion 4*a* is in contact with the enclosing section 8*d*, the movement of the case 8 in the outer peripheral direction can be restricted. Further, since the upper surface and the bottom surface on the inner peripheral side of the frame bell portion 4*a* are also in contact with the enclosing section 8*d*, the movement of the case 8 in the up-down direction can be restricted. Accordingly, it is possible to suppress falling of the enclosing section 8*d* from the inner peripheral side of the frame 4, and thus it is possible to suppress falling of the case inner wall 8*c* from the frame 4.

Incidentally, on the inner peripheral side of the frame 4, the enclosing section 8*d* for fitting the inner peripheral side of the case 8 and the engaging section 5*a*3 for engaging the cover 5 are provided at four locations, respectively. In order to make the enclosing section 8*d* and the engaging section 5*a*3 not interfere with each other on the inner peripheral side of the frame 4, the enclosing section 8*d* and the engaging section 5*a*3 are respectively formed such that the enclosing section 8*d* and the engaging section 5*a*3 are alternately provided in the peripheral direction on the inner peripheral side of the frame 4.

As described above, the case 8 is attached to the frame 4 by fitting the outer peripheral hooking section 8*b* of the case 8 into the frame-side attaching section 4*c* and fitting the enclosing section 8*d* on the inner peripheral side of the frame 4. It is not necessary to form a screw hole in the frame 4 and screw the case 8 and the frame 4 together. Thus, it is possible to suppress the stress concentration on a specific position of the frame 4 due to the screwing, and to uniformize the distribution of the hit sensitivity on the frame 4.

Further, the case 8 is fitted into the frame 4 at two locations, that is, the inner peripheral side and the outer peripheral side of the case 8. At this time, the frame-side attaching section 4*c* and the hooking section 8*b* restrict the movement of the case 8 in the inner peripheral direction, and the enclosing section 8*d* restricts the movement of the case 8 in the outer peripheral direction. Accordingly, the movement of the case 8 in the inner peripheral direction and the outer peripheral direction can be restricted, and thus the case 8 can be reliably and firmly attached to the frame 4.

In addition to the frame-side attaching section 4*c*, the hooking section 8*b*, and the enclosing section 8*d*, the case 8 and the frame 4 are further provided with a structure for restricting the movement of the case 8 in the peripheral direction and the up-down direction. Specifically, a raised support column 8*e* is provided from the bottom surface of the case 8 upward. The support column 8*e* is formed on the inner peripheral side (right side of the paper surface of FIG. 6) of the case outer wall 8*a*, and is formed on the inner peripheral side of the support section 4*c*1 of the frame 4 when the case 8 is attached to the frame 4. The length of the support column 8*e* in the up-down direction is set to such an extent that a gap is formed between the upper surface of the support column 8*e* and the bottom surface of the frame 4 when the case 8 is attached to the frame 4.

Meanwhile, the raised restricting section 4*d* is provided on the bottom surface of the frame 4, that is, on the inner peripheral side of the support column 8*e* when the case 8 is attached to the frame 4. Further, the support column 8*e* of the case 8 is formed on the entire periphery in the peripheral direction of the case 8, and the restricting section 4*d* is also formed on the entire periphery in the peripheral direction of the frame 4.

When the case 8 moves in the inner peripheral direction, the support column 8*e* is in contact with the restricting section 4*d*, and accordingly, the movement in the inner peripheral direction is restricted. Meanwhile, when the case 8 moves significantly in the outer peripheral direction, the support column 8*e* is in contact with the support section 4*c*1, and accordingly, the movement in the outer peripheral direction is restricted. Accordingly, since the positional deviation between the frame 4 and the case 8 in the radial direction can be suppressed, the fitting of the frame 4 and the case 8 can be appropriately maintained.

Further, when the case 8 is attached to the frame 4, a gap is formed between the upper surface of the support column 8*e* and the bottom surface of the frame 4. Accordingly, the contact points (that is, restraint points) between the frame 4 and the case 8 can be reduced, and thus it is possible to suppress a case where the vibration of the frame 4 due to the hit wrap around the case 8 and the vibration of the frame 4 is attenuated. Meanwhile, when an external force is applied from the bottom surface side of the case 8, the gap between the support column 8*e* and the frame 4 disappears, the upper surface of the support column 8*e* and the bottom surface of the frame 4 come into contact with each other, and the support column 8*e* can support the bottom surface side of the case 8. Accordingly, the deformation of the case 8 can be suppressed.

Further, the support section 4*c*1 is a part that fits with the hooking section 8*b*, and is also a part that is in contact with the outer peripheral side of the support column 8*e*. Accordingly, by forming one support section 4*c*1, it is not necessary to separately form the part that fits with the hooking section 8*b* and the part that is in contact with the outer peripheral side of the restricting section 4*d*, and thus the manufacturing cost of the frame 4 can be reduced, and the bottom surface of the frame 4 can be made into a simpler shape. Accordingly, the vibration propagation performance to the frame 4 due to the hit can be improved.

Next, the shape of the case 8 will be described with reference to FIG. 7. (a) of FIG. 7 is a top view of the case 8, and (b) of FIG. 7 is a sectional view of the case 8 in a sectional line taken along VIIb-VIIb of (a) of FIG. 7. As illustrated in FIG. 7, in the case 8, in addition to the case outer wall 8*a*, the hooking section 8*b*, the case inner wall 8*c*, the enclosing section 8*d*, and the support column 8*e*, which were described above, a strut attaching section 8*f*, a case bottom wall 8*g*, and a protecting section 8*h* are provided.

The strut attaching section 8*f* is the center of the bottom surface of the case 8 in a top view, and is a part formed between the case inner wall 8*c* and the case inner wall 8*c* to attach a strut (not illustrated) that supports the electronic cymbal 1. The case bottom wall 8*g* is a wall-shaped part that forms the bottom surface of the case 8. The protecting section 8*h* is a section formed on the case bottom wall 8*g* for protecting electronic components (not illustrated) provided on the bottom surface of the frame 4.

A thick portion 8*g*1, at which the case bottom wall 8*g* is formed to be thick, is formed in the case bottom wall 8*g* at a position on the facing side of the protecting section 8*h* with respect to the strut attaching section 8*f*. Since the electronic component is provided in the frame 4, the weight balance of the frame 4 is biased toward the electronic component due to the weight of the electronic component. Accordingly, when the strut is attached to the strut attaching section 8*f*, the electronic cymbal 1 is tilted toward the side where the electronic component is provided.

Therefore, by forming a thick portion 8*g*1, which is thick, on the case bottom wall 8*g* at the position on the facing side of the protecting section 8*h* with respect to the strut attaching section 8*f*, the weight of the thick portion 8*g*1 in the case 8 is increased. Accordingly, the weight of the thick portion 8*g*1 corrects the bias of the weight balance due to the electronic components provided on the frame 4, and thus it is possible to suppress the tilt of the electronic cymbal 1 when the strut is attached to the strut attaching section 8*f*. Further, by providing the thick portion 8*g*1, the tilt of the electronic cymbal 1 can be suppressed without attaching a separate "weight" to the case 8 or the like.

Although the description has been made based on the above-described embodiment, it can be easily inferred that various improvements and changes are possible.

In the above-described embodiment, the bell portion sensor 6 is separated into two, that is, the inner peripheral sensor 6*a* and the outer peripheral sensor 6*b*. However, the method is not limited to separating the bell portion sensor 6 into two, and the bell portion sensor 6 may be separated into two or more depending on the size of the bell portion 2, and the like. For example, as in the bell portion sensor 60 of (a) of FIG. 8 and the bell portion sensor 61 of (b) of FIG. 8, by providing an outermost peripheral sensor 6*d* in addition to the inner peripheral sensor 6*a* and the outer peripheral sensor 6*b*, the bell portion sensor may be separated into three.

In this case, the connecting section 6*c* may be provided at a position in the same phase between the inner peripheral sensor 6*a* and the outer peripheral sensor 6*b* and between the outer peripheral sensor 6*b* and the outermost peripheral sensor 6*d* as in the bell portion sensor 60 in (a) of FIG. 8, or the connecting section 6*c* may be provided at any position between the inner peripheral sensor 6*a* and the outer peripheral sensor 6*b* and between the outer peripheral sensor 6*b* and the outermost sensor 6*d* as in the bell portion sensor 61 of (b) of FIG. 8. Further, as in the bell portion sensor 61, the connecting sections 6*c* may be provided at four or more locations between the inner peripheral sensor 6*a* and the outer peripheral sensor 6*b* and between the outer peripheral sensor 6*b* and the outermost peripheral sensor 6*d*.

In the above-described embodiment, the bell portion sensor 6 is formed in an arc shape (C shape) in which a part is disconnected in a top view. However, the present invention is not limited thereto, and the bell portion sensor 6 may be formed so as to be continuous in the peripheral direction in a top view.

In the above-described embodiment, the side surface of the frame bell portion 4*a* is formed in a conical shape, and accordingly, the cross section in the radial direction is formed in a linear shape. However, the cross-sectional shape of the frame bell portion 4*a* in the radial direction is not limited to a linear shape, and any shape may be used. For example, as in the frame bell portion 40*a* of (c) of FIG. 8, a recess 40*al* may be formed between the adjacent bell portion sensors 6, or as in the frame bell portion 41*a* of (d) of FIG. 8, a frame bell portion 41*a* may be formed in a hemispherical shape. In either case, it is desirable to form a linear cross-sectional shape in the radial direction at the position where the bell portion sensor 6 is provided at least in the frame bell portions 40*a* and 41*a* such that the bell portion sensor 6 provided on the frame bell portions 40*a* and 41*a* can face the projection portion 5*a*1 of the cover 5.

In the above-described embodiment, the cover bell portion 5*a* is provided with the recess 5*a*2 at a position further on the inner peripheral side than the inner peripheral projection portion 5*al*. However, the present invention is not limited thereto, and for example, as in the cover bell portion 50*a* of (c) of FIG. 8, in addition to the recess 5*a*2, the recess 50*a*2 having a U shape in a sectional view may be provided at a position further on the outer peripheral side than the outer peripheral projection portion 5*al* in the cover bell portion 5*a*. Further, the recess 5*a*2 may be omitted and only the recess 50*a*2 may be provided, or both the recess 5*a*2 and the recess 50*a*2 may be omitted. In addition, the shapes of the recess 5*a*2 and the recess 50*a*2 are not limited to the U shape in a cross-sectional view, but may be a rectangular shape or a V shape.

In the above-described embodiment, when the engaging section 5*a*3 is hooked on the inner peripheral side of the frame bell portion 4*a*, the engaging section 5*a*3 is formed so as to be in contact with the upper surface, the bottom surface, and the side surface of the frame bell portion 4*a*. However, the present invention is not necessarily limited thereto, and for example, as in an engaging section 51*a*3 of the cover bell portion 51*a* in (a) of FIG. 9, the part which is in contact with the bottom surface of the frame bell portion 4*a* may be omitted, and the engaging section 51*a*3 may be formed to be in contact with the upper surface and the side surface of the frame bell portion 4*a*.

In the above-described embodiment, when the enclosing section 8*d* is hooked on the inner peripheral side of the frame bell portion 4*a*, the enclosing section 8*d* is formed so as to be in contact with the upper surface, the bottom surface, and the side surface of the frame bell portion 4*a*. However, the present invention is not necessarily limited thereto, and for example, as in the enclosing section 80*d* of the case 80 of (b) of FIG. 9, the part which is in contact with the bottom surface of the frame bell portion 4*a* may be omitted, and the enclosing section 80*d* may be formed to be engaged with the upper surface and the side surface of the frame bell portion 4*a*.

In the above-described embodiment, the support section 4*c*1 of the frame 4 is formed in an L shape, the open portion thereof is formed toward the outer peripheral side of the frame 4, and the tip end portion 8*b*1 of the hooking section 8*b* of the case 8 is formed toward the inner peripheral side of the case 8. However, the present invention is not necessarily limited thereto, and for example, as in the support section 42*c*1 of the frame 42 in (c) of FIG. 9, the open portion of the support section 42*c*1 is formed toward the inner peripheral side of the frame 4, and a tip end portion 81*b*1 of the hooking section 81*b* in the case 81 may be formed toward the outer peripheral side of the case 8.

In the above-described embodiment, the hooking section 8*b* is provided at the upper portion of the inner peripheral surface of the case outer wall 8*a*. However, the position where the hooking section 8*b* is provided is not necessarily limited thereto, and for example, as in the case 82 of (d) of FIG. 9, the hooking section 82*b* may be provided on the upper surface of the case outer wall 82*a*. At this time, the hooking section 82*b* is formed in the shape of an upwardly raised projection as illustrated in (d) of FIG. 9, a projection accommodating section 43*c*2 of the frame 43 is formed into a counterbore shape, and the hooking section 82*b* may be formed to be fitted into the projection accommodating portion 43*c*2. Accordingly, the load on the lower part of the frame 43 can be supported by the fitting of the hooking section 82*b* and the projection accommodating section 43*c*2, and thus, the support section 4*cl* can be omitted from the frame 43.

Furthermore, when the support section 4*cl* is omitted from the frame 43, a support column 82*e* may further be provided on the outer peripheral side of the restricting section 4*d* in the case 82. Accordingly, by omitting the support section 4*cl*, the movement of the case 82 in the outer peripheral direction, which is not restricted on the outer peripheral side of the case 82, can be restricted by the restricting section 4*d* and the support column 82*e*. It is needless to say that the support column 82*e* may be provided in the case 8 in the above-described embodiment, the case 80 of (b) of FIG. 9, and the case 81 of (c) of FIG. 9.

In the above-described embodiment, the hooking section 8*b* is provided on the case outer wall 8*a*, the case outer wall 82*a*. However, the present invention is not limited thereto. For example, the hooking section 10*b* may be provided at a position closer to the outer side than the case inner wall, like the case 10 shown in FIG. 10. As shown in (a) and (b) of FIG. 10, the hooking section 10*b* is provided on the upper surface of the case bottom wall 8*g*. A tapered tip end portion 10*b*1 is formed on the outer peripheral side of the hooking section 10*b*, and a protruding portion 10*b*2 that protrudes upward is formed on the inner peripheral side of the tip end portion. Further, like the support section 42*cl* and the projection accommodating portion 42*c*2 of the frame 42 shown in (c) of FIG. 10, the support section 42*cl* may extend toward the inner peripheral side of the frame 4, and the tip end portion 10*b*1 of the hooking section 10*b* in the case 10 may be extend toward the outer peripheral side of the case 8 and be fitted into the opening portion with an opening being formed by the support section 42*cl* and the projection accommodating portion 42*c*2 and facing the inner peripheral side of the frame 4. Therefore, the fitting of the hooking section 10*b* into the support section 42*cl* and the projection accommodating portion 42*c*2 can support the downward load of the frame 42.

In the above-described embodiment, an electronic cymbal is illustrated as an example of an electronic percussion instrument. However, the present invention is not limited thereto, and it is needless to say that the technical concept (for example, a configuration in which the thickness of the cover facing the sensor is substantially constant) of the above-described embodiment can be applied to an electronic percussion instrument simulating another musical instrument such as a Cajon or a wood block. Accordingly, for example, in the above-described embodiment, the disc-shaped frame has been described as an example of the main body member which is the skeleton of the electronic percussion instrument, but the present invention is not necessarily limited thereto. For example, the shape of the main body member in a top view may be a rectangular shape, a polygonal shape, or a combination of curved lines and straight lines. Further, the thickness dimension (dimension in the up-down direction) of the main body member may be thicker than that of the cover 5 (for example, the main body member is formed in a box shape).

In the above-described embodiment, the frame 4 is made of reinforced plastic. However, the present invention is not limited thereto, and the frame 4 may be formed of another resin-based material, or may be formed of a metal. Further, in the above-described embodiment, the cover 5 and the case 8 are formed of synthetic rubber, but the present invention is not limited thereto, and other resin-based materials such as silicon may be used.

In the above-described embodiment, the bell portion sensor 6 or the edge portion sensor 7 are adhered to the frame bell portion 4*a* or the frame bow portion 4*b* with a double-sided tape. Further, the cover 5 is adhered to the upper surface of the frame 4 with a double-sided tape, and the cover 5 (bonding section 5*b*4) is adhered to the lower surface of the frame 4 with an adhesive. However, the present invention is not limited thereto, and the bell portion sensor 6 or the edge portion sensor 7 may be adhered to the frame bell portion 4*a* or the frame bow portion 4*b* with an adhesive. Further, the cover 5 may be adhered to the upper surface of the frame 4 with an adhesive, or the cover 5 (bonding section 5*b*4) may be adhered to the lower surface of the frame 4 with a double-sided tape. In other words, the method for bonding each sensor or the cover 5 to the frame 4 is not limited to the method by adhesion, and a known bonding method (for example, fusing the cover 5 to the frame 4) can be applied as long as fixing to the frame 4 is possible.

In the above-described embodiment, a case has been described in which the lower cover portion 5*b*2 is not bonded to the lower surface of the bent portion 4*b*2 or the outer peripheral portion 4*b*3 of the frame bow portion 4*b*, and in this non-bonded region, the lower surfaces of the bent portion 4*b*2 and the outer peripheral portion 4*b*3 and the upper surface of the lower cover portion 5*b*2 are respectively flat surfaces. However, the present invention is not limited thereto, and the lower surface of the frame bow portion 4*b* or the upper surface of the lower cover portion 5*b*2 may be formed with irregularities as long as the deformation of the lower cover portion 5*b*2 toward the inner peripheral side is not hindered. As an example of the configuration, for example, a configuration in which a recess is formed only on the lower surface (the upper surface of the lower cover portion 5*b*2) of the frame bow portion 4*b*, or a configuration having fine irregularities on the lower surface of the frame bow portion 4*b* and the upper surface of the lower cover portion 5*b*2 to the extent that the lower surface of the frame bow portion 4*b* and the upper surface of the lower cover portion 5*b*2 are not hooked on each other, are illustrated.

In the above-described embodiment, a case where the bent portion 4*b*2 and the outer peripheral portion 4*b*3 are formed at the outer edge of the main body portion 4*b*1 of the frame bow portion 4*b* has been described. However, the present invention is not limited thereto, and the bent portion 4*b*2 or the outer peripheral portion 4*b*3 may be omitted, and the frame bow portion 4*b* may be configured as a frame having no step. In this case, the space S may be formed by providing a recessed portion on the outer edge side of the lower surface of the upper cover portion 5*b*1, the edge sensor 7*b* may be accommodated in the space S, the bonding section 5*b*4 of the inner edge part of the lower cover portion 5*b*2 may be omitted, and the lower cover portion 5*b*2 may be bonded to the lower surface of the frame bow portion 4*b*.

In the above-described embodiment, a case where the bonding region R1 is positioned on the inner peripheral side of the space S has been described. However, the present invention is not limited thereto, and the bonding region R1 may be positioned on the outer peripheral side of the space S. In other words, when the lower cover portion 5*b*2 is not bonded on the outer edge side of the lower surface of the frame bow portion 4*b*, the lower cover portion 5*b*2 may be bonded to the lower surface of the bent portion 4*b*2 or the outer peripheral portion 4*b*3 of the frame bow portion 4*b*.

In the above-described embodiment, a case where the bonding section 5*b*4 is bonded from the inner peripheral surface of the bent portion 4*b*2 of the frame bow portion 4*b* to the lower surface of the main body portion 4*b*1 has been described. However, the present invention is not necessarily limited thereto, and a configuration in which the bonding section 5*b*4 is bonded only to the inner peripheral surface of the bent portion 4*b*2 or a configuration in which the bonding section 5*b*4 is bonded only to the lower surface of the main body portion 4*b*1 may be used.

In the above-described embodiment, a case where the thickness dimension L1 of the lower cover portion 5*b*2 is formed to be smaller than the thickness dimension L2 of the upper cover portion 5*b*1 has been described. However, the present invention is not limited thereto, and the thickness dimension L1 of the lower cover portion 5*b*2 and the thickness dimension L2 of the upper cover portion 5*b*1 may be the same, and the thickness dimension L1 of the lower cover portion 5*b*2 may be formed to be larger than the thickness dimension L2 of the upper cover portion 5*b*1.

In the above-described embodiment, a case where the thickness dimension L2 of the upper cover portion 5*b*1 is substantially constant in the region facing the upper surface of the outer peripheral portion 4*b*3 of the frame bow portion 4*b* has been described. However, the present invention is not necessarily limited thereto, and the thickness dimension of the upper cover portion 5*b*1 may be partially reduced. In this case, it is preferable to partially reduce the thickness dimension of the upper cover portion 5*b*1 on the inner peripheral side of the space S (edge sensor 7*b*). For example, in a region that is not bonded to the upper surface of the frame bow portion 4*b*, when the thickness dimension of the upper cover portion 5*b*1 is partially reduced, the thin part is stretched and easily elastically deformed.

In the above-described embodiment, a case where the upper cover portion 5*b*1 is bonded to the upper surface of the frame bow portion 4*b* (main body portion 4*b*1) on the inner peripheral side of the outer edge (space S) of the upper surface of the bent portion 4*b*2 has been described. However, the present invention is not necessarily limited thereto, and the upper cover portion 5*b*1 may be bonded to the entire upper surface of the frame bow portion 4*b*.

In the above-described embodiment, a case where the upper surface of the outer peripheral portion 4*b*3 and the lower surface (the region where the projection portion 5*b*3 is not formed) of the upper cover portion 5*b*1 are parallel to each other has been described. However, the present invention is not limited thereto, and the upper surface of the outer peripheral portion 4*b*3 and the lower surface of the upper cover portion 5*b*1 may be non-parallel in the region facing the upper surface of the outer peripheral portion 4*b*3 (edge sensor 7*b*). In this case, it is preferable that the facing distance between the upper surface of the outer peripheral portion 4*b*3 and the lower surface of the upper cover portion 5*b*1 becomes wider as going toward the outer peripheral side in such a region. Accordingly, the upper cover portion 5*b*1 is elastically deformed such that the lower surface of the upper cover portion 5*b*1 and the upper surface of the outer peripheral portion 4*b*3 come close to each other in parallel at the time of a hit, and thus the edge sensor 7*b* can be pressed by the tip end surface of the projection portion 5*b*3 and the upper surface of the outer peripheral portion 4*b*3, which are parallel to each other. Accordingly, the hit on the upper cover portion 5*b*1 can be appropriately transmitted to the edge sensor 7*b*.

In the above-described embodiment, a case where the bonding section 5*b*4 is hooked on the step formed by the bent portion 4*b*2 and the outer peripheral portion 4*b*3 has been described. However, the present invention is not necessarily limited thereto, and a recess may be formed on the lower surface of the frame bow portion 4*b*, and the bonding section 5*b*4 may be fitted into the recess. Accordingly, the displacement of the bonding section 5*b*4 toward both the outer peripheral side and the inner peripheral side can be restricted. In other words, the recessed portion and the raised portion that can be fitted into each other may be formed on the lower surface of the frame 4 and the upper surface of the cover 5 as long as the position is further on the inner peripheral side than the bonding position between the lower surface of the frame bow portion 4*b* and the part (bonding section 5*b*4) on the inner edge side of the lower cover portion 5*b*2.

In the above-described embodiment, a case where the recessed portion 5*b*5 is formed on the upper surface of the bonding section 5*b*4 to prevent the adhesive from flowing out to the inner peripheral side of the bonding section 5*b*4 has been described. However, the present invention is not necessarily limited thereto, and the recessed portion 5*b*5 may be omitted (or in addition to the recessed portion 5*b*5), and a recessed portion may be provided on the lower surface of the frame bow portion 4*b* to prevent the adhesive from flowing out.

The numerical values given in the above-described embodiment are examples, and it is needless to say that it is possible to adopt other numerical values.

The invention claimed is:

1. An electronic cymbal comprising:

a frame with a disc-shape; and a case attached to a bottom surface of the frame to protect electronic components, wherein the frame is provided with a frame-side attaching section, the case is provided with a case-side attaching section, a case inner wall with a wall-shape that forms an inner peripheral side thereof, a case outer wall with a wall-shape that forms an outer peripheral side thereof, and a case bottom wall with a wall-shape that forms a bottom surface of the case, and the case is attached to the frame by fitting the frame-side attaching section and the case-side attaching section into each other, the case-side attaching section is configured with a hooking section having a tip end portion with a tapered shape and a protruding portion that protrudes upward, the frame-side attaching section is configured with a projection accommodating section into which an upper portion of the hooking section of the case-side attaching section is fitted, and a support section that supports a bottom surface of the case-side attaching section, and the case outer wall is attached to the frame by fitting the hooking section of the case-side attaching section into the projection accommodating section and the support section of the frame-side attaching section.

2. The electronic cymbal according to claim 1, wherein the hooking section is provided at a position closer to an outer side than the case inner wall.

3. The electronic cymbal according to claim 2, wherein the hooking section is provided on the case outer wall.

4. The electronic cymbal according to claim 3, wherein the case-side attaching section is configured with an enclosing section that is provided on the case inner wall and encloses an inner peripheral side of the frame.

5. The electronic cymbal according to claim 3, wherein a support column with a convex shape is provided upward from the bottom surface of the case, a restricting section with a convex shape is provided on the bottom surface of the frame, and when the case is attached to the frame, the inner peripheral side and the outer peripheral side of the support column come into contact with the restricting section such that movement of the case to the inner peripheral side and the outer peripheral side is restricted.

6. The electronic cymbal according to claim 3, wherein a length between a bottom surface of the hooking section and an upper surface of the protruding portion is formed to be larger than a length between an upper surface of the support section of the frame-side attaching section and the bottom surface of the frame.

7. The electronic cymbal according to claim 2, wherein the hooking section is provided on the case bottom wall.

8. The electronic cymbal according to claim 7, wherein the tip end portion with the tapered shape of the case-side attaching section provided on the case bottom wall is formed on an outer peripheral side of the hooking section, and the protruding portion is formed on an inner peripheral side of the tip end portion.

9. The electronic cymbal according to claim 8, wherein a length between a bottom surface of the hooking section and an upper surface of the protruding portion is formed to be larger than a length between an upper surface of the support section of the frame-side attaching section and the bottom surface of the frame.

10. The electronic cymbal according to claim 9, wherein the case-side attaching section is configured with an enclosing section that is provided on the case inner wall and encloses an inner peripheral side of the frame.

11. The electronic cymbal according to claim 9, wherein a support column with a convex shape is provided upward from the bottom surface of the case, a restricting section with a convex shape is provided on the bottom surface of the frame, and when the case is attached to the frame, the inner peripheral side and the outer peripheral side of the support column come into contact with the restricting section such that movement of the case to the inner peripheral side and the outer peripheral side is restricted.

12. The electronic cymbal according to claim 11, wherein the support column is formed in a manner that a gap is provided between the upper surface of the support column and the bottom surface of the frame when the case is attached to the frame.

13. The electronic cymbal according to claim 7, wherein the case includes a strut attaching section for attaching a strut that supports the electronic cymbal, and a protecting section that protects the electronic components, a thick portion thicker than a thickness of the case bottom wall of the protecting section is formed at a position of the case bottom wall facing the protecting section with respect to the strut attaching section.

14. The electronic cymbal according to claim 2, wherein a support column with a convex shape is provided upward from the bottom surface of the case, a restricting section with a convex shape is provided on the bottom surface of the frame, and when the case is attached to the frame, the inner peripheral side and the outer peripheral side of the support column come into contact with the restricting section such that movement of the case to the inner peripheral side and the outer peripheral side is restricted.

15. The electronic cymbal according to claim 1, wherein the case-side attaching section is configured with an enclosing section that is provided on the case inner wall and encloses an inner peripheral side of the frame.

16. The electronic cymbal according to claim 4, wherein a support column with a convex shape is provided upward from the bottom surface of the case, a restricting section with a convex shape is provided on the bottom surface of the frame, and when the case is attached to the frame, the inner peripheral side and the outer peripheral side of the support column come into contact with the restricting section such that movement of the case to the inner peripheral side and the outer peripheral side is restricted.

17. The electronic cymbal according to claim 1, wherein a support column with a convex shape is provided upward from the bottom surface of the case, a restricting section with a convex shape is provided on the bottom surface of the frame, and when the case is attached to the frame, the inner peripheral side and the outer peripheral side of the support column come into contact with the restricting section such that movement of the case to the inner peripheral side and the outer peripheral side is restricted.

18. The electronic cymbal according to claim 5, wherein the support column is formed in a manner that a gap is provided between the upper surface of the support column and the bottom surface of the frame when the case is attached to the frame.

19. The electronic cymbal according to claim 1, wherein the case includes a strut attaching section for attaching a strut that supports the electronic cymbal, and a protecting section that protects the electronic components, a thick portion thicker than a thickness of the case bottom wall of the protecting section is formed at a position of the case bottom wall facing the protecting section with respect to the strut attaching section.

20. A case attachment method for attaching a case to a frame in an electronic cymbal that includes the frame with a disc-shape and the case for protecting electronic components, the case is provided with a case-side attaching section, a case inner wall with a wall-shape that forms an inner peripheral side thereof, a case outer wall with a wall-shape that forms an outer peripheral side thereof, and a case bottom wall with a wall-shape that forms a bottom surface of the case, the case attachment method comprising:

attaching the case to the frame by fitting a frame-side attaching section provided on the frame and a case-side attaching section provided on the case into each other, and attaching the case outer wall to the frame by fitting a hooking section of the case-side attaching section into a projection accommodating section and a support section of the frame-side attaching section, wherein the case-side attaching section is configured with the hooking section having a tip end portion with a tapered shape and a protruding portion that protrudes upward, the frame-side attaching section is configured with the projection accommodating section into which an upper portion of the hooking section of the case-side attaching section is fitted, and the support section that supports a bottom surface of the case-side attaching section.

* * * * *